US012757272B2

(12) United States Patent
Naik et al.

(10) Patent No.: US 12,757,272 B2
(45) Date of Patent: Oct. 6, 2026

(54) ADDRESSING CLIENT CONSTRAINTS IN DYNAMIC SUBCHANNEL OPERATION

(71) Applicant: QUALCOMM Incorporated, San Diego, CA (US)

(72) Inventors: Gaurang Naik, San Diego, CA (US); Alfred Asterjadhi, San Diego, CA (US); George Cherian, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/506,822

(22) Filed: Nov. 10, 2023

(65) Prior Publication Data

US 2025/0159744 A1 May 15, 2025

(51) Int. Cl.
*H04W 76/15* (2018.01)
*H04L 5/00* (2006.01)
*H04W 74/0808* (2024.01)

(52) U.S. Cl.
CPC ........... *H04W 76/15* (2018.02); *H04L 5/0046* (2013.01); *H04W 74/0808* (2013.01)

(58) Field of Classification Search
None
See application file for complete search history.

(56) References Cited

U.S. PATENT DOCUMENTS

2023/0239743 A1 * 7/2023 Sundaravaradhan ........................ H04W 28/20 370/468
2024/0260106 A1 * 8/2024 Shafin ..................... H04L 69/14
(Continued)

OTHER PUBLICATIONS

"26. High-Efficiency (HE) MAC Specification(11ax)", IEEE DRAFT; REVME_CL_26.FM, IEEE-SA, Piscataway, NJ USA, Nno. D3.0, Apr. 10, 2023, pp. 185, XP068200470, REVme_C1_26.fm.rtf, Retrieved on Apr. 10, 2023, Section 26.9.3, p. 122-p. 124.
(Continued)

*Primary Examiner* — Lonnie V Sweet
(74) *Attorney, Agent, or Firm* — Holland & Hart LLP/Qualcomm

(57) ABSTRACT

This disclosure provides methods, components, devices and systems for addressing client constraints in dynamic sub-channel operation (DSO). Some aspects more specifically relate to a DSO frame exchange between an access point (AP) multi-link device (MLD) and a non-AP MLD that is operating in accordance with an enhanced multi-link single-radio (EMLSR) or an enhanced multi-link multi-radio (EMLMR) communication mode. In such aspects, the non-AP MLD may use a frame associated with a DSO frame exchange to trigger the non-AP MLD to perform an operation associated with the EMLSR/EMLMR communication mode. Some additional, or alternative, aspects more specifically relate to a DSO frame exchange between an AP MLD and a non-AP MLD that has disabled a communication mode associated with uplink multi-user (MU) communication. In such aspects, the AP MLD and the non-AP MLD may apply one or more constraints on the DSO frame exchange associated with the disabled uplink MU communication.

29 Claims, 12 Drawing Sheets

(56) References Cited

U.S. PATENT DOCUMENTS

| | | | | |
|---|---|---|---|---|
| 2024/0381462 | A1* | 11/2024 | Barton | H04W 24/08 |
| 2025/0016860 | A1* | 1/2025 | Lorgeoux | H04W 76/34 |
| 2025/0393069 | A1* | 12/2025 | Viger | H04W 74/0816 |

OTHER PUBLICATIONS

International Search Report and Written Opinion—PCT/US2024/046787—ISA/EPO—Feb. 19, 2025 (2400599WO).

Kneckt J (Apple Inc.), "OM Control Comment Resolutions", IEEE P802.11 Wireless LANs, 11-18-1246-04-00AX-CR-FOR-OMI, IEEE-SA Mentor, Piscataway, NJ USA, vol. 802.11ax, No. 4, Sep. 11, 2018, pp. 1-15, XP068128392, Retrieved on Sep. 11, 2018, Section 9.2.3.6s.2, p. 8-p. 9.

BROADCOM: "Dynamic Subband Operation", 11-22-2204-00-0UHR-Dynamic-Subband-Operation, IEEE-SA Mentor, Piscataway, NJ, USA, vol. 802.11 UHR, Jan. 18, 2023, 13 Pages, XP068200997.

IEEE: "35. Extremely high throughput (EHT) MAC specification", TGBE_CL_35, IEEE-SA, Piscataway, NJ, USA, vol. 802.llbe drafts, No. D4.1, Sep. 22, 2023, 174 Pages, XP068203004, Section 35.3.17 and 35.3.18, p. 84-p. 91.

Mediatek: "EMLSR Dynamic Subband Operation", 11-23-1496-00-0UHR-EMLSR-Dynamic-Subband-Operation, IEEE-SA Mentor, Piscataway, NJ, USA vol. 802.11 UHR, Sep. 14, 2023, 14 Pages, XP068205281.

OPPO: "Considerations on Dynamic Subchannel Operation", 11-23-0843-01-0UHR-Considerations-On-Dynamic-Subchannel-Operation, IEEE-SA Mentor, Piscataway, NJ, USA, vol. 802.11 UHR, No. 1, Jul. 13, 2023, 10 Pages, XP068204454.

Partial International Search Report—PCT/US2024/046787—ISA/EPO—Dec. 10, 2024.

* cited by examiner

ADDRESSING CLIENT CONSTRAINTS IN DYNAMIC SUBCHANNEL OPERATION

TECHNICAL FIELD

This disclosure relates to wireless communication and, more specifically, to addressing client constraints in dynamic subchannel operation (DSO).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a wireless communication device. The wireless communication device may include a processing system that includes processor circuitry and memory circuitry that stores code. The processing system may be configured to cause the wireless communication device to transmit a first frame including an indication that the wireless communication device is operating in accordance with a communication mode associated with one or more constraints on multi-link operation (MLO) at the wireless communication device, receive, via a first link associated with the MLO at the wireless communication device, a second frame associated with a dynamic subchannel operation (DSO) frame exchange on the first link, where the second frame allocates, to the wireless communication device, one or more resource units (RUs) associated with a subchannel of the first link, and communicating, via the one or more RUs associate with the subchannel of the first link, a third frame in accordance with the DSO frame exchange and the communication mode.

Another innovative aspect of the subject matter described in this disclosure can be implemented in a method for wireless communication by a wireless communication device. The method may include transmitting a first frame including an indication that the wireless communication device is operating in accordance with a communication mode associated with one or more constraints on MLO at the wireless communication device, receiving, via a first link associated with the MLO at the wireless communication device, a second frame associated with a DSO frame exchange on the first link, where the second frame allocates, to the wireless communication device, one or more RUs associated with a subchannel of the first link, and communicating, via the one or more RUs associated with the subchannel of the first link, a third frame in accordance with the DSO frame exchange and the communication mode.

Another innovative aspect of the subject matter described in this disclosure can be implemented in a wireless communication device. The wireless communication device may include means for transmitting a first frame including an indication that the wireless communication device is operating in accordance with a communication mode associated with one or more constraints on MLO at the wireless communication device, means for receiving, via a first link associated with the MLO at the wireless communication device, a second frame associated with a DSO frame exchange on the first link, where the second frame allocates, to the wireless communication device, one or more RUs associated with a subchannel of the first link, and means for communicating, via the one or more RUs associated with the subchannel of the first link, a third frame in accordance with the DSO frame exchange and the communication mode.

Another innovative aspect of the subject matter described in this disclosure can be implemented in a non-transitory computer-readable medium storing code for wireless communication by a wireless communication device. The code may include instructions executable by one or more processors to transmit a first frame including an indication that the wireless communication device is operating in accordance with a communication mode associated with one or more constraints on MLO at the wireless communication device, receive, via a first link associated with the MLO at the wireless communication device, a second frame associated with a DSO frame exchange on the first link, where the second frame allocates, to the wireless communication device, one or more RUs associated with a subchannel of the first link, and communicating, via the one or more RUs associate with the subchannel of the first link, a third frame in accordance with the DSO frame exchange and the communication mode.

In some examples of the method, wireless communication devices, and non-transitory computer-readable medium described herein, communicating the third frame may include operations, features, means, or instructions for transmitting the third frame as a response to the second frame, where the second frame may be a trigger frame associated with the DSO frame exchange.

Some examples of the method, wireless communication devices, and non-transitory computer-readable medium described herein may further include operations, features, means, or instructions for switching to a transmit mode on the subchannel of the first link in association with the second frame allocating the one or more RUs associated with the subchannel of the first link, where the third frame may be transmitted after switching to the transmit mode on the subchannel of the first link.

In some examples of the method, wireless communication devices, and non-transitory computer-readable medium described herein, communicating the third frame may include operations, features, means, or instructions for receiving the third frame via the one or more RUs associated with the subchannel of the first link, where the second frame may be an announcement frame associated with the DSO frame exchange, and where the third frame may be a trigger frame associated with the DSO frame exchange.

Some examples of the method, wireless communication devices, and non-transitory computer-readable medium described herein may further include operations, features, means, or instructions for switching to a receive mode on the subchannel of the first link in association with the second frame allocating the one or more RUs associated with the subchannel of the first link, where the third frame may be received after switching to the receive mode on the subchannel of the first link.

Some examples of the method, wireless communication devices, and non-transitory computer-readable medium described herein may further include operations, features, means, or instructions for transmitting, via a station (STA) affiliated with the wireless communication device, an indication that the STA supports the DSO frame exchange on the first link, where the indication that the STA supports the DSO frame exchange on the first link may be independent from the indication that the wireless communication device may be operating in accordance with the communication mode.

Some examples of the method, wireless communication devices, and non-transitory computer-readable medium described herein may further include operations, features, means, or instructions for transmitting, via a fourth frame, information indicative of multiple sets of padding delay and transition delay in association with operating in accordance with the communication mode and supporting the DSO frame exchange on the first link, where communication via the one or more RUs associated with the subchannel of the first link may be in accordance with at least one of the multiple sets of padding delay and transition delay.

Another innovative aspect of the subject matter described in this disclosure can be implemented in a wireless communication device. The wireless communication device may include a processing system that includes processor circuitry and memory circuitry that stores code. The processing system may be configured to cause the wireless communication device to transmit a frame including an indication that the wireless communication device has disabled a communication mode associated with uplink multi-user (MU) communication, receive, in accordance with the indication that the wireless communication device has disabled the communication mode, a trigger frame associated with a DSO frame exchange, where the trigger frame allocates, to the wireless communication device, one or more RUs associated with a subchannel, and receive, via the one or more RUs associated with the subchannel, a data frame in accordance with the DSO frame exchange and the indication that the wireless communication device has disabled the communication mode.

Another innovative aspect of the subject matter described in this disclosure can be implemented in a method for wireless communication by a wireless communication device. The method may include transmitting a frame including an indication that the wireless communication device has disabled a communication mode associated with uplink MU communication, receiving, in accordance with the indication that the wireless communication device has disabled the communication mode, a trigger frame associated with a DSO frame exchange, where the trigger frame allocates, to the wireless communication device, one or more RUs associated with a subchannel, and receiving, via the one or more RUs associated with the subchannel, a data frame in accordance with the DSO frame exchange and the indication that the wireless communication device has disabled the communication mode.

Another innovative aspect of the subject matter described in this disclosure can be implemented in a wireless communication device. The wireless communication device may include means for transmitting a frame including an indication that the wireless communication device has disabled a communication mode associated with uplink MU communication, means for receiving, in accordance with the indication that the wireless communication device has disabled the communication mode, a trigger frame associated with a DSO frame exchange, where the trigger frame allocates, to the wireless communication device, one or more RUs associated with a subchannel, and means for receiving, via the one or more RUs associated with the subchannel, a data frame in accordance with the DSO frame exchange and the indication that the wireless communication device has disabled the communication mode.

Another innovative aspect of the subject matter described in this disclosure can be implemented in a non-transitory computer-readable medium storing code for wireless communication by a wireless communication device. The code may include instructions executable by one or more processors to transmit a frame including an indication that the wireless communication device has disabled a communication mode associated with uplink MU communication, receive, in accordance with the indication that the wireless communication device has disabled the communication mode, a trigger frame associated with a DSO frame exchange, where the trigger frame allocates, to the wireless communication device, one or more RUs associated with a subchannel, and receive, via the one or more RUs associated with the subchannel, a data frame in accordance with the DSO frame exchange and the indication that the wireless communication device has disabled the communication mode.

In some examples of the method, wireless communication devices, and non-transitory computer-readable medium described herein, the DSO frame exchange may be exclusively associated with downlink communication to the wireless communication device in accordance with the indication that the wireless communication device may have disabled the communication mode.

In some examples of the method, wireless communication devices, and non-transitory computer-readable medium described herein, the trigger frame may be an MU-request to send (RTS) frame type in accordance with the indication that the wireless communication device may have disabled the communication mode.

Another innovative aspect of the subject matter described in this disclosure can be implemented in a first wireless communication device. The first wireless communication device may include a processing system that includes processor circuitry and memory circuitry that stores code. The processing system may be configured to cause the first wireless communication device to receive a first frame including an indication that a second wireless communication device is operating in accordance with a communication mode associated with one or more constraints on MLO at the second wireless communication device, transmit, via a first link associated with the MLO at the second wireless communication device, a second frame associated with a DSO frame exchange on the first link, where the second frame allocates, to the second wireless communication device, one or more RUs associated with a subchannel of the first link, and communicating, via the one or more RUs associate with the subchannel of the first link, a third frame in accordance with the DSO frame exchange and the communication mode.

Another innovative aspect of the subject matter described in this disclosure can be implemented in a method for wireless communication by a first wireless communication device. The method may include receiving a first frame including an indication that a second wireless communication device is operating in accordance with a communication mode associated with one or more constraints on MLO at the second wireless communication device, transmitting, via a first link associated with the MLO at the second wireless communication device, a second frame associated with a DSO frame exchange on the first link, where the second frame allocates, to the second wireless communication device, one or more RUs associated with a subchannel of the first link, and communicating, via the one or more RUs associated with the subchannel of the first link, a third frame in accordance with the DSO frame exchange and the communication mode.

Another innovative aspect of the subject matter described in this disclosure can be implemented in a first wireless communication device. The first wireless communication device may include means for receiving a first frame including an indication that a second wireless communication device is operating in accordance with a communication mode associated with one or more constraints on MLO at the second wireless communication device, means for transmitting, via a first link associated with the MLO at the second wireless communication device, a second frame associated with a DSO frame exchange on the first link, where the second frame allocates, to the second wireless communication device, one or more RUs associated with a subchannel of the first link, and means for communicating, via the one or more RUs associated with the subchannel of the first link, a third frame in accordance with the DSO frame exchange and the communication mode.

Another innovative aspect of the subject matter described in this disclosure can be implemented in a non-transitory computer-readable medium storing code for wireless communication by a wireless communication device. The code may include instructions executable by one or more processors to receive a first frame including an indication that a second wireless communication device is operating in accordance with a communication mode associated with one or more constraints on MLO at the second wireless communication device, transmit, via a first link associated with the MLO at the second wireless communication device, a second frame associated with a DSO frame exchange on the first link, where the second frame allocates, to the second wireless communication device, one or more RUs associated with a subchannel of the first link, and communicating, via the one or more RUs associate with the subchannel of the first link, a third frame in accordance with the DSO frame exchange and the communication mode.

In some examples of the method, first wireless communication devices, and non-transitory computer-readable medium described herein, communicating the third frame may include operations, features, means, or instructions for receiving the third frame as a response to the second frame, where the second frame may be a trigger frame associated with the DSO frame exchange.

In some examples of the method, first wireless communication devices, and non-transitory computer-readable medium described herein, the second frame triggers the second wireless communication device to switch to a transmit mode on the subchannel of the first link and the second frame may be transmitted as an initial control frame of the communication mode in accordance with receiving the indication that the second wireless communication device may be operating in accordance with the communication mode.

In some examples of the method, first wireless communication devices, and non-transitory computer-readable medium described herein, communicating the third frame may include operations, features, means, or instructions for transmitting the third frame via the one or more RUs associated with the subchannel of the first link, where the second frame may be an announcement frame associated with the DSO frame exchange, and where the third frame may be a trigger frame associated with the DSO frame exchange.

In some examples of the method, first wireless communication devices, and non-transitory computer-readable medium described herein, the second frame triggers the second wireless communication device to switch to a receive mode on the subchannel of the first link and the second frame may be transmitted as an initial control frame of the communication mode in accordance with receiving the indication that the second wireless communication device may be operating in accordance with the communication mode.

Another innovative aspect of the subject matter described in this disclosure can be implemented in a first wireless communication device. The first wireless communication device may include a processing system that includes processor circuitry and memory circuitry that stores code. The processing system may be configured to cause the first wireless communication device to receive a frame including an indication that a second wireless communication device has disabled a communication mode associated with uplink MU communication, transmit, in accordance with the indication that the second wireless communication device has disabled the communication mode, a trigger frame associated with a DSO frame exchange, where the trigger frame allocates, to the second wireless communication device, one or more RUs associated with a subchannel, and transmit, via the one or more RUs associated with the subchannel, a data frame in accordance with the DSO frame exchange and the indication that the second wireless communication device has disabled the communication mode.

Another innovative aspect of the subject matter described in this disclosure can be implemented in a method for wireless communication by a first wireless communication device. The method may include receiving a frame including an indication that a second wireless communication device has disabled a communication mode associated with uplink MU communication, transmitting, in accordance with the indication that the second wireless communication device has disabled the communication mode, a trigger frame associated with a DSO frame exchange, where the trigger frame allocates, to the second wireless communication device, one or more RUs associated with a subchannel, and transmitting, via the one or more RUs associated with the subchannel, a data frame in accordance with the DSO frame exchange and the indication that the second wireless communication device has disabled the communication mode.

Another innovative aspect of the subject matter described in this disclosure can be implemented in a first wireless communication device. The first wireless communication device may include means for receiving a frame including an indication that a second wireless communication device has disabled a communication mode associated with uplink MU communication, means for transmitting, in accordance with the indication that the second wireless communication device has disabled the communication mode, a trigger frame associated with a DSO frame exchange, where the trigger frame allocates, to the second wireless communication device, one or more RUs associated with a subchannel, and means for transmitting, via the one or more RUs associated with the subchannel, a data frame in accordance with the DSO frame exchange and the indication that the second wireless communication device has disabled the communication mode.

Another innovative aspect of the subject matter described in this disclosure can be implemented in a non-transitory computer-readable medium storing code for wireless communication by a wireless communication device. The code may include instructions executable by one or more processors to receive a frame including an indication that a second wireless communication device has disabled a communication mode associated with uplink MU communication, transmit, in accordance with the indication that the second wireless communication device has disabled the communication mode, a trigger frame associated with a DSO frame exchange, where the trigger frame allocates, to the second wireless communication device, one or more RUs associated with a subchannel, and transmit, via the one or more RUs associated with the subchannel, a data frame in accordance with the DSO frame exchange and the indication that the second wireless communication device has disabled the communication mode.

In some examples of the method, first wireless communication devices, and non-transitory computer-readable medium described herein, the DSO frame exchange may be exclusively associated with downlink communication to the second wireless communication device in accordance with the indication that the second wireless communication device may have disabled the communication mode.

In some examples of the method, first wireless communication devices, and non-transitory computer-readable medium described herein, the trigger frame may be an MU-RTS frame type in accordance with the indication that the second wireless communication device may have disabled the communication mode.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
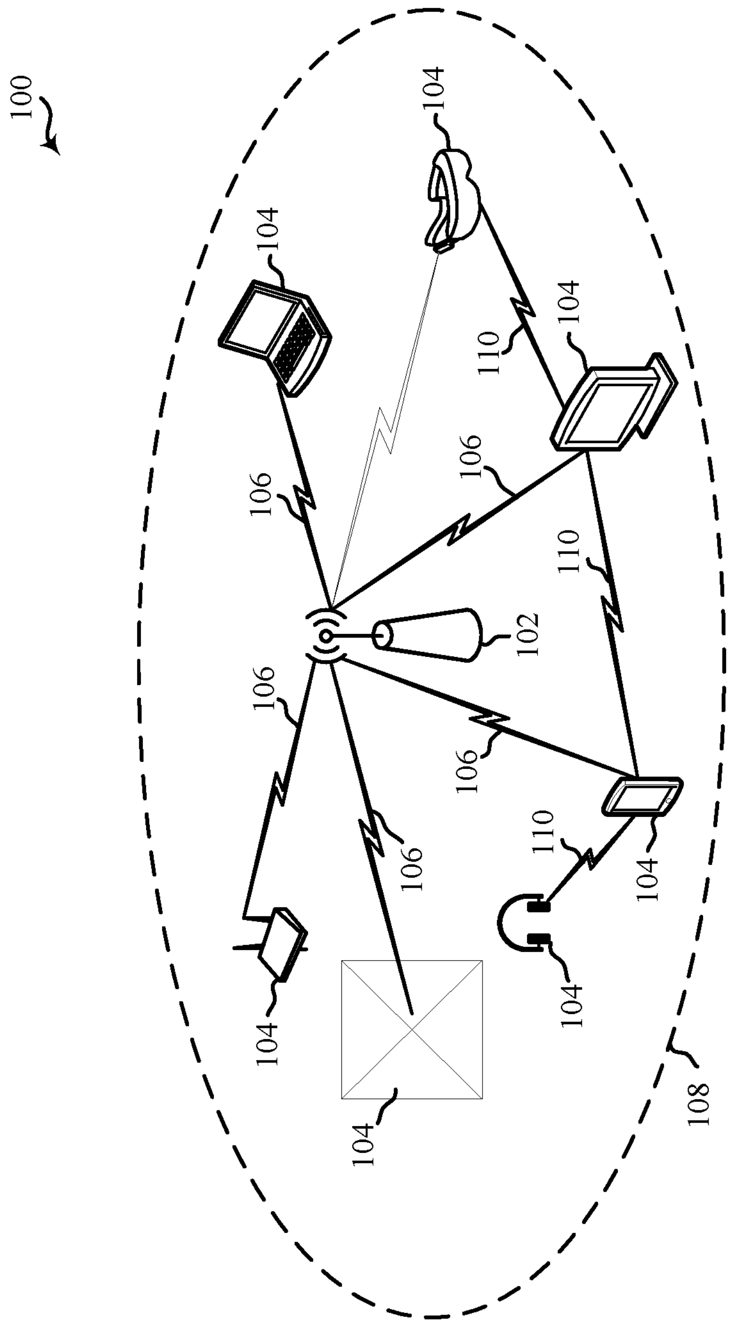
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to dynamic subchannel operation (DSO) frame exchanges, including DSO frame exchanges via one or more links on which one or more other modes of operation may apply. Some aspects more specifically relate to a DSO frame exchange between an access point (AP) multi-link device (MLD) and a non-AP MLD that is operating in accordance with an enhanced multi-link single-radio (EMLSR) or an enhanced multi-link multi-radio (EMLMR) communication mode. Such communication modes may be associated with one or more constraints on multi-link operation (MLO) at the non-AP MLD, which may impact a compatibility with DSO frame exchanges in some systems. In some examples, the non-AP MLD, via a station (STA) affiliated with the non-AP MLD, may receive a frame associated with a DSO frame exchange (such as a DSO announcement frame or a DSO trigger frame) and may use the frame (which may be referred to as a DSO frame) to initiate, trigger, or otherwise cause the non-AP MLD to perform one or more operations associated with the EMLSR/EMLMR communication mode. For example, the non-AP MLD may interpret the DSO frame as an initial control frame (ICF) associated with the EMLSR/EMLMR communication mode. In accordance with interpreting the DSO frame as the ICF (or otherwise in accordance with the DSO frame being transmitted as the ICF), the non-AP MLD may switch to a transmit or receive mode on a subchannel allocated by the DSO frame on a link via which the DSO frame was received, which, in some instances, may result in greater compatibility between DSO frame exchanges and an EMLSR/EMLMR communication mode. As described herein, a wireless communication device (such as an AP or a non-AP) may "interpret" a frame in accordance with receiving, obtaining, decoding, parsing, or otherwise extracting information from the frame and using, employing, leveraging, or otherwise applying such information to trigger or cause one or more operations (such as radio tuning or switching) at the wireless communication device.

Some additional, or alternative, aspects more specifically relate to a DSO frame exchange between an AP MLD and a non-AP MLD that has disabled a communication mode associated with uplink multi-user (MU) communication (such as an uplink MU communication mode) at the non-AP MLD, as a disabling of such a communication mode also may impact a compatibility with DSO frame exchanges in some systems. In some examples, the AP MLD and the non-AP MLD may apply one or more constraints on the DSO frame exchange in accordance with the non-AP MLD having disabled the uplink MU communication mode. For example, the AP MLD and the non-AP MLD may limit DSO frame exchanges to downlink communication and refrain from uplink transmissions during DSO frame exchanges. Additionally, or alternatively, the AP MLD may use specific frame types associated with the DSO frame exchange in accordance with the non-AP MLD having disabled the uplink MU communication mode, with such specific frame types being compatible with the disabled uplink MU communication mode. Additionally, or alternatively, the AP MLD and the non-AP MLD may support a modified feedback mechanism according to which the AP MLD may solicit feedback from the non-AP MLD after at least a threshold time duration after a data frame was communicated (such as transmitted or received) via the DSO frame exchange. In some implementations, for example, the non-AP MLD may receive a data frame via a secondary subchannel as part of a DSO frame exchange and, in accordance with the uplink MU communication mode being disabled, may switch back to a primary subchannel prior to expecting to receive a feedback solicitation from the AP MLD.

Particular aspects of the subject matter described in this disclosure can be implemented to realize one or more of the following potential advantages. In some examples, by supporting DSO in combination with other modes of operation, the described techniques may be used to increase compatibility across multiple different modes of operation at a non-AP MLD and to retain the greater spectral efficiency provided by DSO. For example, in accordance with supporting mechanisms to enable an EMLSR/EMLMR STA to use a DSO frame as an ICF associated with an EMLSR/EMLMR communication mode, the EMLSR/EMLMR STA may operate in accordance with the EMLSR/EMLMR communication mode while still being able to dynamically switch between different subchannels on a given link, which may enable an AP MLD to more efficiently serve multiple client devices simultaneously across a wide bandwidth. Further, in accordance with supporting mechanisms to enable a non-AP MLD with an uplink MU communication mode disabled to participate in a DSO frame exchange, the AP MLD may add robustness to its ability to serve multiple client devices simultaneously across a wide bandwidth by being able to include devices of varying capabilities or limitations within a DSO frame exchange. In accordance with such greater compatibility across multiple modes of operations, more networks may be able to more fully implement DSO, which may result in greater spectral efficiency in more deployment scenarios, which may in turn support higher data rates, lower latency, and greater capacity, among other benefits.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

In some examples, the AP 102 or the STAs 104 of the wireless communication network 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (such as High Efficiency (HE) systems or other legacy systems). For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or “4×80”) MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHz bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate subchannel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of the wireless communication network 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

Retransmission protocols, such as hybrid automatic repeat request (HARQ), also may offer performance gains. A HARQ protocol may support various HARQ signaling between transmitting and receiving wireless communication devices (such as the AP 102 and the STAs 104 described with reference to FIG. 1) as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

APs and STAs (such as the AP 102 and the STAs 104 described with reference to FIG. 1) that include multiple antennas may support various diversity schemes. For example, spatial diversity may be used by one or both of a transmitting device (such as either an AP 102 or a STA 104) or a receiving device (such as either an AP 102 or a STA 104) to increase the robustness of a transmission. For example, to implement a transmit diversity scheme, a transmitting device may transmit the same data redundantly over two or more antennas.

APs 102 and STAs 104 that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU-MIMO transmissions (also referred to as spatial division multiple access (SDMA)). In the MU-MIMO context, beamforming may additionally or alternatively involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

In some implementations, the AP 102 and STAs 104 can support various multi-user communications; that is, concurrent transmissions from one device to each of multiple devices (such as multiple simultaneous downlink communications from an AP 102 to corresponding STAs 104), or concurrent transmissions from multiple devices to a single device (such as multiple simultaneous uplink transmissions from corresponding STAs 104 to an AP 102). As an example, in addition to MU-MIMO, the AP 102 and STAs 104 may support OFDMA. OFDMA is, in some aspects, a multi-user version of OFDM.

In OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Other tone RUs also may be allocated, such as 52 tone, 106 tone, 242 tone, 484 tone and 996 tone RUs. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective AIDs, and may assign each AID (and thus each STA 104) one or more RUs that can be used to send UL traffic to the AP 102. The AP also may designate one or more random access (RA) RUs that unscheduled STAs 104 may contend for.

Some wireless communication devices (including both APs and STAs such as, for example, AP 102 and STAs 104 described with reference to FIG. 1) are capable of multi-link operation (MLO). In some examples, MLO supports establishing multiple different communication links (such as a first link on the 2.4 GHz band, a second link on the 5 GHz band, and the third link on the 6 GHz band) between the STA 104 and the AP 102 and exchanging packets on one or more communications links concurrently and dynamically. Each communication link may support one or more sets of channels or logical entities. In some examples, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as an MLD. An MLD may include a single upper MAC layer, and can include, for example, three independent lower MAC layers and three associated independent PHY layers for respective links in the 2.4 GHz, 5 GHz, and 6 GHz bands. This architecture may enable a single association process and security context. An AP MLD may include multiple APs each configured to communicate on a respective communication link with a respective one of multiple STAs 104 of a non-AP MLD (also referred to as a "STA MLD"). The STA MLD may communicate with the AP MLD over one or more of the multiple communication links at a given time. MLDs may independently contend for access on each of the communication links, which achieves latency reduction by enabling the MLD to transmit its packets on the first communication link that becomes available.

Another feature of MLO is Traffic Steering and QoS characterization, which achieves latency reduction and other QoS enhancements by mapping traffic flows having different latency or other requirements to different links. For example, traffic with low latency requirements can be mapped to wireless links operating in the 6 GHz band and more latency-tolerant flows can be mapped to wireless links operating in the 2.4 GHz or 5 GHz bands.

One type of MLO is alternating multi-link, in which a MLD may listen to two different high performance channels at the same time. When an MLD has traffic to send, it may use the first channel with an access opportunity (such as TXOP). While the MLD may only use one channel to receive or transmit at a time, having access opportunities in two different channels provides low latency when networks are congested.

Another type of MLO is multi-link aggregation (MLA), where traffic associated with a single STA 104 is simultaneously transmitted across multiple communication links in parallel to maximize the utilization of available resources to achieve higher throughput. This is akin to carrier aggregation in the cellular space. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a wireless communication network 100. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Some wireless communication devices (such as APs 102 or STAs 104) may be capable of communicating (such as receiving, monitoring, or transmitting) via a primary 20 MHz channel along with one or more additional 20 MHz channels within an operating bandwidth (which may be equivalently referred to herein as an operational bandwidth). In some implementations, the wireless communication devices may be capable of monitoring only one primary 20 MHz channel for preambles of frames. However, in some other implementations, such as when the wireless communication devices support multi-primary channel access, the wireless communication devices may be capable of monitoring multiple 20 MHz channels. In other words, the wireless communication devices may be capable of supporting multiple primary channels. Such a monitoring of multiple 20 MHz channels may be sequential (such that when one 20 MHz channel is measured to be busy, a device may switch to a next 20 MHz channel and continue monitoring) or may be parallel (such that a device can monitor multiple 20 MHz channels simultaneously). Such a primary channel may be referred to as a main primary (M-Primary) channel and such an additional channel may be referred to as an opportunistic primary (O-Primary) channel. In some networks, wireless communication devices may use the M-Primary for beaconing and serving some client devices and may use an O-Primary channel for opportunistic access to under-utilized channels. For example, if a wireless communication device measures, identifies, ascertains, or otherwise determines that one channel (such as an M-Primary channel) is busy or occupied (such as due to an overlapping BSS (OBSS) transmission), the wireless communication device may switch (at least in examples of sequential contention) to an O-Primary channel.

In some aspects, simultaneous transmission and reception (STR) operation may not be possible on an M-Primary channel or an O-Primary channel for some wireless communication devices (due to, for example, an interference criteria). Multiple simultaneous transmissions (such as simultaneous Tx/Tx) or multiple simultaneous receptions (such as simultaneous Rx/Rx) may be possible on an M-Primary channel or an O-Primary channel. In some aspects, to support multiple simultaneous receptions, wireless communication devices may use a threshold separation in frequency to increase a likelihood of successful reception and decoding.

In some networks, such as the wireless communication network 100, an AP 102 may support (such as be capable of communicating via) a relatively larger bandwidth than one or more STAs 104 that the AP 102 serves. In other words, in some networks, one or more Wi-Fi client devices (such as one or more STAs 104) may not support a full bandwidth option supported by the serving AP 102. For example, an AP 102 may support up to a 320 MHz bandwidth and a STA 104 served by the AP 102 may support or may be operating in a relatively smaller 40 MHz, 80 MHz, or 160 MHz bandwidth. One or more other STAs 104 may support the full bandwidth of the AP 102. Such STAs 104 may be referred to or understood as wideband STAs 104.

If at least one client device (such as at least one STA 104) is a wideband STA 104, a serving AP 102 may use MU OFDMA to schedule one or more resource units (RUs) to the wideband STA 104 in a secondary channel. For example, if the wideband STA 104 supports up to a 160 MHz bandwidth, the AP 102 may schedule one or more RUs to the wideband STA 104 in the secondary 80 MHz channel (such as a portion of the 160 MHz bandwidth excluding the primary 20 MHz subchannel). Alternatively, if no client device is a wideband STA 104, potentially large portions of an operational bandwidth may go under-utilized, which may result in relatively poor spectral efficiency. For example, secondary channels (such as a secondary 40 MHz channel, a secondary 80 MHz channel, or a secondary 160 MHz channel) may frequently go unused if client devices are unable to communicate via the full bandwidth (such as a 160 MHz or 320 MHz bandwidth) supported by the serving AP 102. Further, because Wi-Fi devices may contend for access on a primary subchannel, access to wide bandwidths (regardless of size) may be contingent on access to the primary subchannel. Therefore, if an OBSS device (such as an AP 102 or a STA 104) occupies the primary subchannel, a remainder of the wide bandwidth may remain unutilized, which also may contribute to lower throughput and longer latencies.

To address such a potential under-utilization of communication resources, some networks may employ signaling mechanisms to allow narrowband devices (such as a STA 104 capable of communicating via a portion of the full operational bandwidth supported by the serving AP 102) to use different portions of the operational bandwidth. To communicate with narrowband STAs 104 on a nonprimary subchannel, some networks may leverage a subchannel selective transmission (SST) mechanism. SST may use individual target wake time (TWT) to negotiate semi-static service periods (SPs) during which narrowband STAs 104 may switch to nonprimary subchannels, which may result in a lack of flexibility. For example, the semi-static SPs associated with SST may be difficult to change or update and, likewise, may be too rigid for some deployment scenarios.

Alternatively, some networks may employ dynamic subchannel operation (DSO) to increase (such as maximize) spectral efficiency by allowing relatively more dynamic switching between primary and nonprimary subchannels. In accordance with DSO, multiple STAs 104 may be dynamically scheduled for simultaneous communication (such as uplink or downlink communication), each via a different portion of an operational bandwidth of a serving AP 102, via one or both of an announcement frame and a trigger frame. For example, during a same first time period, a first STA 104 may be scheduled to communicate with the serving AP 102 via a primary 40 MHz, a second STA 104 may be scheduled to communicate with the serving AP 102 via a secondary 40 MHz subchannel, and a third STA may be scheduled to communicate with the serving AP 102 via a secondary 80 MHz subchannel. In the example of downlink communication from the serving AP 102 to the three STAs 104, such scheduled communication may include, within a single PPDU, a 40 MHz transmission to the first STA 104 (a first in-BSS STA 104), a 40 MHz transmission to the second STA 104 (a second in-BSS STA 104), and an 80 MHz transmission to the third STA 104 (a third in-BSS STA 104). In accordance with DSO, the serving AP 102 may schedule communication with a fourth STA 104 during a second time period. In examples in which the fourth STA 104 is a wideband STA 104, and in examples in which the communication includes downlink signaling from the serving AP 102 to the fourth STA 104, such communication may include an in-BSS transmission to the fourth STA 104 (which may be understood as a 160 MHz or 320 MHz STA 104).

An ability of a STA 104 to participate in a DSO frame exchange (which may include an optional announcement frame, a trigger frame, one or more data frames, and zero or more acknowledgement (ACK) or block acknowledgement (BA) frames) may be associated with a DSO capability of the STA 104. For example, to enable DSO, a STA 104 (such as a narrowband STA 104) may be expected to be capable of dynamically switching one or more radios of the STA 104 from a primary subchannel to a secondary subchannel, and vice versa, which may incur some amount of delay. Further, to enable DSO, a STA 104 may be expected to be capable of receiving one or more frames via secondary subchannels that are sent (by the serving AP 102) in a single PPDU that spans both the primary and secondary subchannels.

As part of DSO, a STA 104 may keep a radio "parked" on (such as tuned to) a primary subchannel, such as a primary 20 MHz subchannel, and may switch the radio to a secondary channel in accordance with receiving an instruction on at least the primary 20 MHz subchannel from a serving AP 102. In other words, a STA 104 may keep a radio tuned or configured to receive signaling via a primary subchannel and may switch to a secondary channel (such as a secondary subchannel) when instructed to do so by an AP 102. In some aspects, an AP 102 may transmit a switching message (such as an indication or instruction for a STA 104 to switch from a primary subchannel to a secondary subchannel) in a non-high throughput (HT) duplicate PPDU. Further, in some aspects, uplink transmissions via secondary subchannels may be expected to be trigger-based in accordance with DSO. After a STA 104 switches to a secondary subchannel and transmits or receives data via the secondary subchannel, the STA 104 may switch back to the primary subchannel in accordance with not detecting any frame addressed to the STA 104 (such as itself) within a timeout interval. Such a timeout interval may start at a trailing edge of a PPDU most recently transmitted by or received at the STA 104. Such a rule to switch back to the primary subchannel in accordance with an absence of communication to or from the STA 104 via the secondary subchannel for a threshold amount of time (such as the timeout interval) may be similar to frame exchange sequence rules associated with EMLSR operation and EMLMR operation.

In some deployment scenarios, a STA 104 may enable a DSO mode of operation in addition to one or more other modes of operation. For example, a non-AP STA affiliated with an MLD may simultaneously enable an EMLSR mode and a DSO mode. An EMLSR non-AP MLD may monitor one or more links using a single radio (such as a single fully functional radio, in addition to, in some scenarios, one or more lower functioning or less capable radios) and, to switch the non-AP MLD on one of the monitored links, an AP 102 may transmit an EMLSR initial control frame (ICF). In other words, an EMLSR non-AP MLD may only switch to a link on which an ICF is received and may not be able to transmit or receive any frames on the other EMLSR links until the non-AP MLD switches back to monitoring the one or more links, which may be understood as a constraint on MLO at the non-AP MLD. An EMLMR mode may be associated with one or more similar constraints on MLO. Although the techniques defined herein are with respect to an EMLSR mode of operation, these techniques also may apply to an EMLMR mode, a multi-primary channel access mode, or one or more variants of a dynamic spatial multiplexing power save mode. In some aspects, an ICF may solicit an immediate response from the EMLSR non-AP MLD, whereas a DSO announcement frame may not solicit a response. As such, one or more challenges or ambiguities may arise when EMLSR and DSO modes are simultaneously enabled at the non-AP MLD.

Additionally, or alternatively, a non-AP STA (such as a STA 104) may simultaneously disable an uplink MU (UL MU) or UL MU Data mode and enable a DSO mode. A non-AP STA may disable the UL MU or the UL MU Data mode for any one of various reasons and, if the non-AP STA disables UL MU, the non-AP STA may only expect to receive an MU-request to send (RTS) type trigger frame (such as an MU-RTS Trigger frame). For example, the non-AP STA may not be expected to respond to any trigger frame except for an MU-RTS Trigger frame when UL MU is disabled. Thus, the non-AP STA may not be expected to receive other types of trigger frames, such as a buffer status report poll (BSRP) Trigger frame, which may be used as part of a DSO frame exchange. Accordingly, a STA 104 with an UL MU or UL MU Data mode disabled may fail to support a initial frame exchange associated with a DSO mode. Further, when UL MU Data is disabled, the non-AP STA may not be expected to respond to Basic Trigger frames, but may respond to other trigger frame variants. Accordingly, an AP 102 may not be able to solicit an ACK from a DSO STA 104 in the secondary subchannel, as the ACK would be transmitted by the DSO STA 104 in a TB PPDU, which may further complicate STA operation when an UL MU or UL MU Data mode is disabled at the same time a DSO mode is enabled.

In some implementations, an AP 102 (such as an AP MLD) and one or more STAs 104 (such as non-AP MLDs) may support one or more configuration- or signaling-based mechanisms according to which STAs 104 with a DSO mode of operation enabled simultaneously with another mode of operation (such as an EMLSR or EMLMR mode of operation, or an UL MU or UL MU Data disabled mode of operation) may participate in a (modified) DSO frame exchange. For example, in implementations in which a STA 104 simultaneously enables DSO and a EMLSR/EMLMR communication mode, the STA 104 and a serving AP 102 may participate in a DSO frame exchange that triggers EMLSR/EMLMR operations via an interpretation of a DSO frame as an ICF associated with the EMLSR/EMLMR communication mode. Additionally, or alternatively, in implementations in which a STA 104 enables DSO and disables UL MU or UL MU Data mode simultaneously, the STA 104 and a serving AP 102 may participate in a DSO frame exchange in accordance with one or more limitations or signaling mechanisms associated with the UL MU or UL MU Data mode being disabled.

Further, although described herein in the context of communication between one or more STAs 104 and a single AP 102, the described techniques may be applicable to scenarios in which multiple APs 102 are present or to scenarios in which a STA 104 roams from one AP 102 to another AP 102. For example, if a non-AP MLD (such as a STA 104) has enabled a communication mode (such as an EMLSR communication mode, a DSO mode, or a multi-primary channel access mode) at or with a serving AP MLD (such as a first AP 102), the communication mode may remain enabled if the non-AP MLD roams to a target AP MLD (such as a second AP 102).

Further, as described herein, a “channel” and a “subchannel” may be used interchangeably, and each may refer to a portion of a frequency spectrum via which communication between two or more wireless communication devices can be allocated. For example, a subchannel or channel may refer to a discrete amount of frequency of an operating bandwidth. For example, a subchannel or a channel may refer to a 20 MHz portion, a 40 MHz portion, an 80 MHz portion, or a 160 MHz portion, among other examples. In other words, each of one or more subchannels may include one or more 20 MHz channels. A primary subchannel or channel may be understood as a portion of a frequency spectrum that includes a primary 20 MHz used for beaconing, among other frame transmissions. In some aspects, different portions of a frequency spectrum (such as a 40 MHz portion, an 80 MHz portion, or a 160 MHz portion) may be associated with multiple (20 MHz) subchannels and at least one unique anchor subchannel. In some aspects, an anchor subchannel may define or identify a lowest (20 MHz) subchannel within a given portion of a frequency spectrum. For example, a first anchor subchannel may define or identify a lowest 20 MHz subchannel within a secondary 40 MHz bandwidth and a second anchor subchannel may define or identify a lowest 20 MHz subchannel within a secondary 80 MHz bandwidth.

Figure 2:
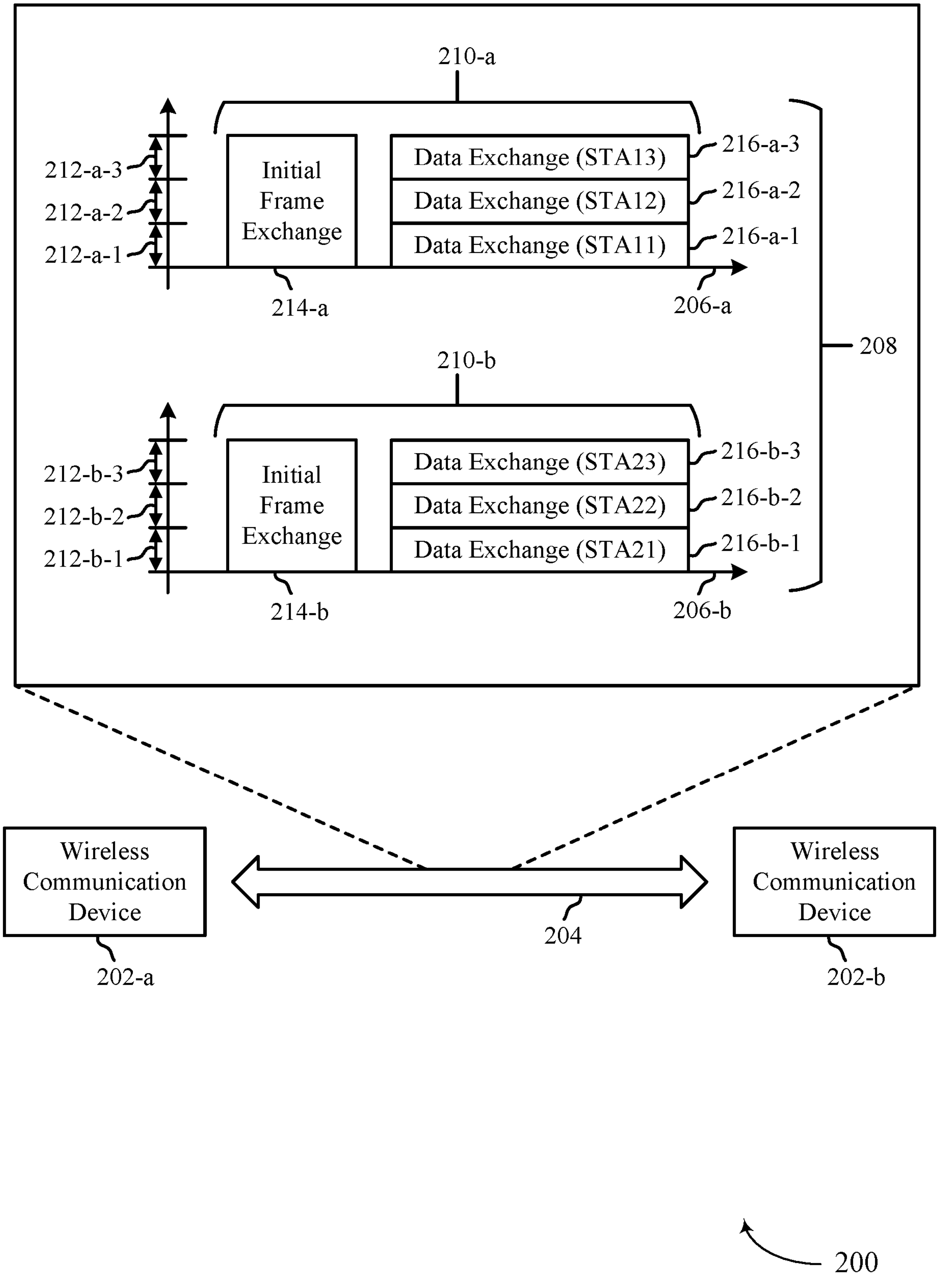
FIG. 2 shows an example signaling diagram that supports addressing client constraints in dynamic subchannel operation (DSO).

FIG. 2 shows an example signaling diagram 200 that supports addressing client constraints in DSO. The signaling diagram 200 may implement or be implemented to realize one or more aspects of the wireless communication network 100. For example, the signaling diagram 200 illustrates communication between a wireless communication device 202-*a* and a wireless communication device 202-*b* via a wireless medium 204, with the wireless communication device 202-*a* being an example of an AP 102 (as illustrated by and described with reference to FIG. 1) and the wireless communication device 202-*b* being an example of a STA 104 (as illustrated by and described with reference to FIG. 1). The wireless medium 204 may be associated with a frequency spectrum, or multiple frequency spectrums or portions thereof, via which the wireless communication device 202-*a* and the wireless communication device 202-*b* may communicate via over-the-air (OTA) signaling.

In some examples, and as illustrated by the signaling diagram 200, the wireless communication device 202-*a* and the wireless communication device 202-*b* may be example of MLDs, each capable of communicating via one or more of multiple links. For example, the wireless communication device 202-*a* and the wireless communication device 202-*b* may each support communication via at least a link 206-*a* (such as a first link) and a link 206-*b* (such as a second link). In some aspects, the wireless communication device 202-*b* may enable a communication mode 208 associated with one or more constraints on MLO at the wireless communication device 202-*b*. For example, the communication mode 208 may be an MLO-level mode and may impart constraints on communication via the link 206-*a* and the link 206-*b*.

The communication mode 208 may be an EMLSR mode or an EMLMR mode, both of which may be associated with one or more constraints on MLO at the wireless communication device 202-*b*. In examples in which the communication mode 208 is an EMLSR mode, the link 206-*a* and the link 206-*b* may form an EMLSR link set (such that the link 206-*a* and the link 206-*b* may be understood or referred to as EMLSR links). In some implementations, the wireless communication device 202-*b* may transmit, to the wireless communication device 202-*a*, a frame including an indication that the wireless communication device 202-*b* is operating in accordance with the communication mode 208. In some aspects, such a frame may be an enhanced multi-link (EML) operating mode notification frame.

Additionally, in some examples, the wireless communication device 202-*b* may support DSO on each of the link 206-*a* and the link 206-*b*. For example, the wireless communication device 202-*b* may support DSO 210-*a* on the link 206-*a* and may support DSO 210-*b* on the link 206-*b*. In some aspects, DSO may be a link-specific mode of operation. As such, the wireless communication device 202-*b* may enable DSO for each of the link 206-*a* and the link 206-*b* independently. In some implementations, to support one or both of the DSO 210-*a* and the DSO 210-*b* and the communication mode 208 (such as the EMLSR or EMLMR mode) simultaneously, the wireless communication device 202-*b* may enable both the DSO and the communication mode 208 separately (such as via separate frames or via separate indications within a same frame) or at the same time (such as via a same frame).

In some aspects, each of the link 206-*a* and the link 206-*b* may be associated with a respective set of subchannels. For example, the link 206-*a* may be associated with a set of subchannels 212-*a* (which may refer to any one or more of a subchannel 212-*a*-1, a subchannel 212-*a*-2, and a subchannel 212-*a*-3) and the link 206-*b* may be associated with a set of subchannels 212-*b* (which may refer to any one or more of a subchannel 212-*b*-1, a subchannel 212-*b*-2, and a subchannel 212-*b*-3). The subchannel 212-*a*-1 may be an example of or include a primary subchannel (such as a primary 20 MHz subchannel or a primary 40 MHz subchannel) associated with the link 206-*a* and each of the subchannel 212-*a*-2 and the subchannel 212-*a*-3 may be examples of secondary subchannels associated with the link 206-*a*. The subchannel 212-*b*-1 may be an example of or include a primary subchannel (such as a primary 20 MHz subchannel or a primary 80 MHz subchannel) associated with the link 206-*b* and each of the subchannel 212-*b*-2 and the subchannel 212-*b*-3 may be examples of secondary subchannels associated with the link 206-*b*.

Within a DSO frame exchange sequence, the wireless communication device 202-*a* and the wireless communication device 202-*b* may participate in an initial frame exchange via the link on which a DSO frame exchange is initiated. For example, if the DSO frame exchange is initiated on the link 206-*a*, the wireless communication device 202-*a* and the wireless communication device 202-*b* may participate in an initial frame exchange 214-*a*. Alternatively, if the DSO frame exchange is initiated on the link 206-*b*, the wireless communication device 202-*a* and the wireless communication device 202-*b* may participate in an initial frame exchange 214-*b*. In either case, an initial frame exchange associated with a DSO frame exchange may include an optional announcement frame sent by the wireless communication device 202-*a*, a trigger frame sent by the wireless communication device 202-*a*, and a response sent by the wireless communication device 202-*b* (the response being associated with, such as responsive to, the trigger frame). The announcement frame, if transmitted, may be addressed to STAs 104 that are to be allocated resource units on a secondary subchannel. The trigger frame may allocate (such as assign) resources to each of the STAs 104 participating in the DSO frame exchange (which may include the wireless communication device 202-*b* and one or more other wireless communication devices).

In the example of the signaling diagram 200, the initial frame exchange 214-*a* may allocate resources for data exchanges via the link 206-*a* for a STA11, a STA12, and a STA13. Such data exchanges may include a data exchange 216-*a*-1 for the STA11, a data exchange 216-*a*-2 for the STA12, and a data exchange 216-*a*-3 for the STA13. Further, the initial frame exchange 214-*b* may allocate resources for data exchanges via the link 206-*b* for a STA21, a STA22, and a STA23. Such data exchanges may include a data exchange 216-*b*-1 for the STA21, a data exchange 216-*b*-2 for the STA22, and a data exchange 216-*b*-3 for the STA23. Any one or more of the STA11, the STA12, the STA13, the STA21, the STA22, and the STA 23 may be affiliated with the wireless communication device 202-*b*, while others may be affiliated with other wireless communication devices.

Within a DSO frame exchange, one of various scenarios may occur depending on whether the wireless communication device 202-*b* (or a STA affiliated with the wireless communication device 202-*b*) is assigned resources on a primary subchannel of a link or one or more of secondary subchannels of a link. For example, in scenarios in which the wireless communication device 202-*b* (or a STA affiliated with the wireless communication device 202-*b*) is assigned resources on a primary subchannel of a link, a DSO frame exchange may support such scenarios in accordance with a BSRP Trigger frame being an allowed ICF for the communication mode 208 and in accordance with an allocating frame of the DSO frame exchange (such as the announcement frame or the trigger frame) being an MU-RTS Trigger frame or a BSRP Trigger frame. Although BSRP Trigger frames and MU-RTS Trigger frames are referred to in some examples described herein, the initial frame exchange of a DSO frame exchange sequence may be performed using any valid Trigger frame variant. In such scenarios, the wireless communication device 202-*a* may be affiliated with the STA11 (if the DSO frame exchange occurs on the link 206-*a*) or the STA21 (if the DSO frame exchange occurs on the link 206-*b*), and such a STA may be understood or referred to as an EMLSR STA.

In some aspects, the STA11 and the STA21 may be extremely high throughput (EHT) EMLSR STAs and, if EHT EMLSR STAs, a BSRP trigger frame of the DSO frame exchange may include a padding portion, which may be used by the EMLSR STAs to switch from a listening mode (such as a listening operation, and which may be referred to as a 1×1 mode, implying that the STA is only capable of receiving frames sent using 1 spatial stream while in the listening operation) to a transmit or receive mode (such as a transmit or receive operation, and which may be referred to as a 2×2 or N×N mode, implying that the STA is not restricted to receiving frames sent using 1 spatial stream). An EMLSR STA of the wireless communication device 202-*b* may request a duration of the padding portion for the BSRP Trigger frame via an EMLSR padding delay subfield (such as via a frame transmission to the wireless communication device 202-*a*) and the padding portion of the BSRP Trigger frame may account for the padding as requested by the EMLSR STA in the EMLSR padding delay subfield accordingly. In some aspects, the STA11 and STA21 may be incapable of being assigned resources in the secondary subchannels (for example, because STA11 and STA21 are EHT STAs and may not support DSO). In some aspects, if the STA11 or the STA21 (such as STAs allocated resources on a primary subchannel) are associated with a sufficient capability, such as a ultra-high reliability (UHR) capability, further enhancements to the DSO frame exchange may be desirable.

Alternatively, in scenarios in which the wireless communication device 202-*b* (or a STA affiliated with the wireless communication device 202-*b*) is assigned resources on a secondary subchannel of a link, some DSO frame exchanges may be unable to support such operation while still complying with rules associated with the communication mode

208 (such as while still complying with EMLSR rules of some systems). In other words, if the wireless communication device 202-*a* is affiliated with the STA12, the STA13, the STA22, or the STA23 (such as STAs that are allocated resources on a secondary subchannel) and if any of such STAs is an EMLSR STA, some system rules associated with the communication mode 208 may be incompatible with or otherwise prohibit or reduce the efficacy of the DSO frame exchange. Accordingly, additional configurational support and signaling sequences associated with an interaction of DSO and the communication mode 208 may be desired.

In accordance with some example implementations, the wireless communication device 202-*a* and the wireless communication device 202-*b* may support one or more configuration- or signaling-based mechanisms associated with an interaction between DSO and the communication mode 208. In some implementations, the wireless communication device 202-*a* and the wireless communication device 202-*b* may support a constraint associated with how RUs are allocated to the wireless communication device 202-*b* in accordance with the wireless communication device 202-*b* operating in accordance with the communication mode 208. For example, the wireless communication device 202-*a* and the wireless communication device 202-*b* may support a constraint such that an EMLSR/EMLMR STA is only scheduled one or more RUs on a primary subchannel of a link (such as within an operating bandwidth of the EMLSR/EMLMR STA). In accordance with such a constraint, an EMLSR/EMLMR STA may participate in a DSO frame exchange but may be limited to communication via the primary subchannel. In some aspects, such a constraint may be understood as, or equivalent to, disallowing DSO and the communication mode 208 simultaneously.

Alternatively, in some other implementations, the wireless communication device 202-*a* and the wireless communication device 202-*b* may support one or more mechanisms according to which an EMLSR/EMLMR STA may interpret a frame associated with a DSO frame exchange as an ICF (such as an EMLSR/EMLMR ICF) and use the frame to trigger an EMLSR/EMLMR operation (such as an EMLSR/EMLMR frame exchange sequence) at the wireless communication device 202-*b*. The specific frame that the wireless communication device 202-*b* may interpret as an ICF may be associated with (such as depend on) whether the DSO frame exchange includes an announcement frame.

For example, in implementations in which the DSO frame exchange excludes an announcement frame, an EMLSR/EMLMR STA that receives a trigger frame associated with the DSO frame exchange (such as a BSRP Trigger frame) may treat (such as use or interpret) the trigger frame as an EMLSR/EMLMR ICF even if one or more RUs allocated to the EMLSR/EMLMR STA are outside of an operating bandwidth of the EMLSR/EMLMR STA. In other words, the trigger frame associated with the DSO frame exchange, which may be understood as a DSO ICF, may serve multiple purposes including as a DSO ICF and as an EMLSR/EMLMR ICF.

Alternatively, in implementations in which the DSO frame exchange includes an announcement frame, an EMLSR/EMLMR STA that receives the announcement frame (which may be referred to as a DSO Announcement frame) may treat (such as use or interpret) the announcement frame as an EMLSR/EMLMR ICF. In other words, the announcement frame that announces a start (such as a beginning) of a DSO frame exchange may act as an EMLSR/EMLMR ICF for the wireless communication device 202-*b* operating in accordance with the communication mode 208, regardless of whether the wireless communication device 202-*b* is assigned resources in the primary subchannel or in a secondary subchannel. For example, depending on an RU Allocation subfield of the announcement frame, the EMLSR/EMLMR STA may switch to a transmit or receive mode (such as a 2×2 mode) on either the primary subchannel of the link on which the announcement frame is received or a secondary subchannel of the link on which the announcement frame is received.

In some implementations, in accordance with the announcement frame associated with the DSO frame exchange being interpreted as the EMLSR/EMLMR ICF and triggering the switch to the 2×2 mode at the wireless communication device 202-*b*, the trigger frame (such as the BSRP Trigger frame) associated with the DSO frame exchange may exclude a padding portion to account for EMLSR/EMLMR STAs (such as UHR EMLSR/EMLMR STAs), as this padding may already be provided by the announcement frame. In some implementations, the wireless communication device 202-*b* may recognize (such as identify, ascertain, or otherwise select) a DSO Announcement frame in accordance with an uplink length field (such as an UL Length field) being set equal to 0 or an RU allocation being outside of the operating bandwidth of the wireless communication device 202-*b*, or both.

In accordance with enabling DSO and the communication mode 208 simultaneously, the wireless communication device 202-*b* may report multiple sets of switching and transition delays. For example, an EMLSR non-AP MLD (such as the wireless communication device 202-*b*) may declare (such as report, indicate, or transmit information indicative of) a first switching delay and a first transition delay of the EMLSR non-AP MLD associated with (such as applicable) when a STA affiliated with the EMLSR non-AP MLD is switching to a primary subchannel of a link and may declare (such as report, indicate, or transmit information indicative of) a second switching delay and a second transition delay of the EMLSR non-AP MLD associated with (such as applicable) when a STA affiliated with the EMLSR non-AP MLD is switching to a secondary subchannel of a link. In some implementations, the wireless communication device 202-*b* may initially transmit a first indication of the multiple sets of switching and transition delays (such as via an association frame during association with the wireless communication device 202-*a*) and, at some point thereafter, may transmit a second indication of the multiple sets of switching and transition delays. In other words, both sets of delays may be updated by the wireless communication device 202-*b* post-association (such that the second indication of the multiple sets of switching and transition delays is indicative of updated versions of the multiple sets of switching and transition delays).

In addition to, or as an alternative to, supporting one or more configuration- or signaling-based mechanisms associated with an interaction between DSO and the communication mode 208, the wireless communication device 202-*a* and the wireless communication device 202-*b* may support one or more configuration- or signaling-based mechanisms associated with an interaction between DSO and one or more other modes of operation, including a mode of operation associated with an UL MU or an UL MU Data mode being disabled at the wireless communication device 202-*b*. For example, when UL MU is disabled, a non-AP STA (such as a non-AP STA affiliated with the wireless communication device 202-*b*) may only expect to receive a single Trigger frame variant, MU-RTS. Further, the non-AP STA may be unable to generate trigger-based (TB) PPDUs and, consequently, the non-AP STA may be unable to response to some trigger frames used as part of a DSO frame exchange in some systems, unless the trigger frame is an MU-RTS Trigger frame. Further, when UL MU is disabled, the non-AP STA may be unable to respond with feedback (such as via an ACK frame or a BA frame) to an MU PPDU, as the feedback may be expected to be transmitted in a TB PPDU (which the non-AP STA may be unable to generate). Additionally, when UL MU Data is disabled, the non-AP STA may be unable to participate in TB uplink frame exchanges.

In accordance with some example implementations of the present disclosure, the wireless communication device 202-*a* and the wireless communication device 202-*b* may support one or more constraints or limitations associated with simultaneous enablement of DSO and disablement of one or both of UL MU or UL MU Data. In some implementations, for example, the wireless communication device 202-*a* and the wireless communication device 202-*b* may limit DSO frame exchanges to downlink. In other words, when either UL MU is disabled or UL MU Data is disabled, the wireless communication device 202-*a* may use DSO frame exchanges exclusively for downlink communication. For example, the wireless communication device 202-*a* may not perform TB uplink frame exchanges within a DSO frame exchange in accordance with the wireless communication device 202-*b* simultaneously enabling DSO and disabling one or both of UL MU or UL MU Data.

Additionally, or alternatively, the wireless communication device 202-*a* and the wireless communication device 202-*b* may support additional configurations or expectations associated with a type of trigger frame used in an initial frame exchange associated with a DSO frame exchange. For example, when UL MU is disabled, the wireless communication device 202-*a* may be expected to use an MU-RTS frame type as the trigger frame associated with the DSO frame exchange. As part of a DSO frame exchange with an announcement frame, the wireless communication device 202-*a* may replace the BSRP Trigger frame sometimes used in DSO frame exchanges in some systems with an MU-RTS Trigger frame and, in some aspects, the wireless communication device 202-*a* may be expected to use an MU-RTS frame type as the DSO announcement frame. As part of a DSO frame exchange without an announcement frame, the wireless communication device 202-*a* may be expected to only use an MU-RTS frame type as the DSO ICF (such as the trigger frame associated with the DSO frame exchange). Additionally, in some implementations, the wireless communication device 202-*a* and the wireless communication device 202-*b* may support a signaling mechanism associated with feedback transmissions from DSO STAs, the signaling mechanism being associated with the wireless communication device 202-*b* simultaneously enabling DSO and disabling one or both of UL MU and UL MU Data. Additional details relating to such a signaling mechanism are illustrated and described herein, including by and with reference to FIG. 3.

Figure 3:
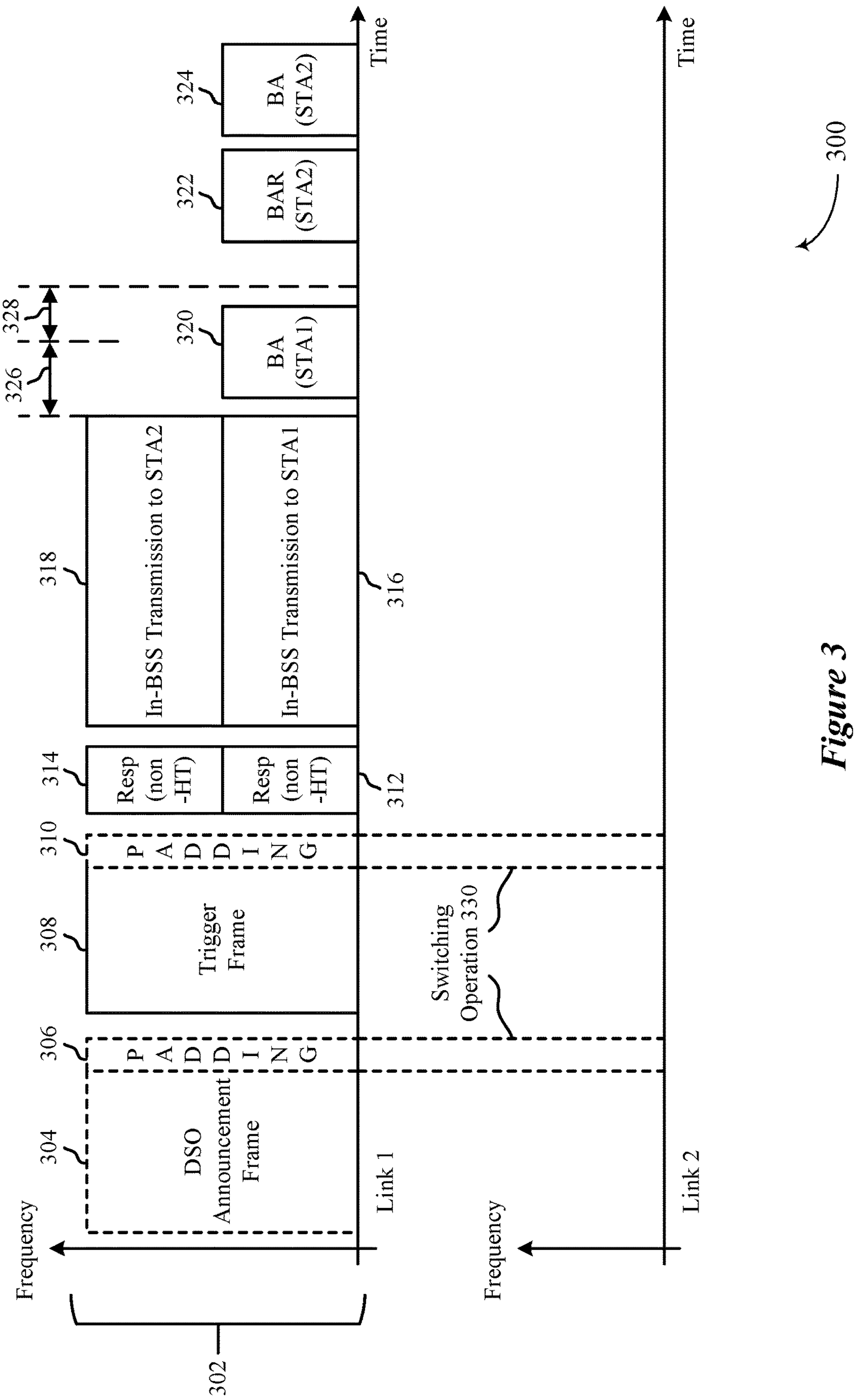
FIGS. 3 and 4 show example DSO frame exchanges that support addressing client constraints in DSO.

FIG. 3 shows an example DSO frame exchange 300 that supports addressing client constraints in dynamic subchannel operation. The DSO frame exchange 300 (which may be equivalently understood or referred to as a DSO frame exchange sequence) may implement or be implemented to realize aspects of the wireless communication network 100 or the signaling diagram 200. For example, the DSO frame exchange 300 may illustrate communication between at least two wireless communication devices, such as at least the wireless communication device 202-*a* and the wireless communication device 202-*b* as illustrated by and described with reference to FIG. 2.

For example, the DSO frame exchange 300 may illustrate communication between an AP 102 (such as an AP MLD, such as the wireless communication device 202-*a*) and a STA1 and between the AP 102 and a STA2, with the STA1 or the STA2 being an example of a STA 104 affiliated with a non-AP MLD (such as the wireless communication device 202-*b*). The STA1 and the STA2 may operate on a first link (such as a link 1, which may be an example of the link 206-*a* as illustrated and described with reference to FIG. 2), with the first link and a second link (such as a link 2, which may be an example of the link 206-*b* as illustrated and described with reference to FIG. 2) forming, for example, an EMLSR link set of the non-AP MLD.

The DSO frame exchange 300, which may be associated with a channel access protocol across a BSS bandwidth 302 (such as a 160 MHz bandwidth or a 320 MHz bandwidth, among other examples), may optionally include an announcement frame. For example, the DSO frame exchange 300 may include a DSO announcement frame 304 or may exclude the DSO announcement frame 304 depending on the variant of the DSO frame exchange 300. In an example of the DSO frame exchange 300 with an announcement frame, the AP 102 may transmit the DSO announcement frame 304 and may address the DSO announcement frame 304 to one or more STAs (such as the STA2 in the example of FIG. 3) that are assigned resources (such as one or more RUs) outside of a primary subchannel. In some aspects, the AP 102 may signal the resource assignment via the DSO announcement frame 304. For example, the DSO announcement frame 304 may include a subfield indicative of the resource assignment for the STA2 (such as a resource assignment of, for example, a secondary 40 MHz, a secondary 80 MHz, or a secondary 160 MHz). The AP 102 may transmit the DSO announcement frame 304 via a full operating bandwidth (such as the BSS bandwidth 302) and via a non-HT duplicate PPDU with no ACK requested. In some implementations, the STA2 may receive the DSO announcement frame 304 and may interpret the DSO announcement frame 304 as an ICF associated with a communication mode at the STA2, such as an ICF associated with an EMLSR or EMLMR communication mode.

The DSO announcement frame 304 may include a padding portion 306, which may provide time for the STA2 to switch to the secondary subchannel (such as a secondary 40 MHz, a secondary 80 MHz, or a secondary 160 MHz) of the first link on which the DSO announcement frame 304 is received. In some implementations, a duration of the padding portion 306 may be associated with (such as depend on or correlate with) whether the STA2 is switching to a primary subchannel or a secondary subchannel. For example, the STA2 may report at least two different switching delays, with a first switching delay applicable to when the STA2 is switching to a primary subchannel and a second switching delay applicable to when the STA2 is switching to a secondary subchannel. In implementations in which the DSO announcement frame 304 is transmitted and includes the padding portion 306, the STA2 may perform a switching operation 330 during the padding portion 306. Such a switching operation 330 may include switching from a listening mode (such as a 1×1 mode) to a transmit or receive mode (such as a 2×2 or N×N mode) on the first link (such as the link on which the DSO announcement frame 304 is received). In some implementations, the switching operation 330 may further include switching (such as tuning) to the indicated subchannel (such as the secondary subchannel of the first link).

The AP 102 may transmit a trigger frame 308 associated with the DSO frame exchange as an ICF of the DSO frame exchange 300 (if the DSO announcement frame 304 is not transmitted) or as a frame that follows the DSO announcement frame 304. The trigger frame 308 may be referred to or understood as a DSO ICF in examples in which the DSO frame exchange 300 excludes the DSO announcement frame 304. The trigger frame 308 may be an MU-RTS Trigger frame or a BSRP Trigger frame or another Trigger frame variant and may signal the resource assignments for both the STA1 and the STA2. For example, the trigger frame 308 may allocate one or more RUs associated with a first subchannel (such as a primary subchannel) to the STA1 and may allocate one or more RUs associated with a second subchannel (such as a secondary subchannel) to the STA2. In some implementations, including implementations in which the DSO frame exchange 300 excludes the DSO announcement frame 304, the trigger frame 308 may include a padding portion 310 to provide time for the STAs to switch to their allocated (such as designated) subchannels. In implementations in which the trigger frame 308 includes the padding portion 310, the STA2 may perform the switching operation 330 during the padding portion 310.

In implementations in which the DSO announcement frame 304 is transmitted and includes the padding portion 306, the AP 102 may refrain from including the padding portion 310 in the trigger frame 308 because sufficient padding delay may already be provided by the padding portion 306. Alternatively, in implementations in which the STA1 allocated one or more RUs on the primary subchannel is an EHT EMLSR STA, the AP 102 may include the padding portion 310 in the trigger frame 308 to account for the padding delay associated with the EMLSR STA to switch from listening mode to a transmit or receive mode, regardless of whether the DSO announcement frame 304 was transmitted with or without the padding portion 306.

Additionally, or alternatively, a wireless communication device (such as the STA2) may check a validity of the DSO Announcement frame or the DSO ICF before deciding (such as selecting, determining, or identifying) to switch to the secondary subchannel. The wireless communication device may check the validity to avoid false switching in case the DSO Announcement frame or the DSO ICF is incorrectly received. In some implementations, the AP 102 may include a second frame check sequence (FCS) field before the padding to allow (such as enable or facilitate) the wireless communication device to check the validity of the DSO Announcement frame or the DSO ICF. The second FCS may be included in a Special User Info field that is identified by a special AID value (such as an AID value of 2044). The DSO STAs that are assigned resources (such as RUs) in the secondary subchannels may decode the Special User Info field associated with the special AID value and validate the received DSO Announcement frame or DSO ICF. If the DSO Announcement frame or DSO ICF is determined, identified, ascertained, or otherwise evaluated to be valid, the DSO STA may initiate the switch to the secondary subchannel without decoding (such as parsing) the rest of the DSO Announcement frame or DSO ICF.

In implementations in which a Special User Info field is included to carry the FCS field, the AP 102 may include the User Info fields of the DSO Announcement frame or the DSO ICF in a specific order. For example, the User Info fields that assign resources to DSO STAs may be included first (such as before the other User Info fields), followed by the Special User Info field associated with the special AID value that carries the FCS field, followed by the User Info fields associated with one or more non-DSO STAs that are assigned resources in the primary subchannel. In such implementations, the DSO STAs may additionally treat the User Info fields after the Special User Info field associated with the special AID value as additional padding. The AP may do so in order to provide sufficient time for the DSO STAs to switch to their respective subchannels.

In accordance with receiving the trigger frame 308, each of the STA1 and the STA2 may perform a CCA energy detection (CCA-ED) during a short inter-frame space (SIFS) after the trigger frame 308 (and, if included, after the padding portion 310 of the trigger frame 308) on the allocated subchannels. In some aspects, the STA1 and the STA2 may perform the CCA-ED to measure whether the allocated subchannels are available (such as not occupied by other wireless communication devices). If the CCA-ED is successful (such as indicative of less than or equal to a threshold interference), the STA1 and the STA2 may transmit response frames associated with the trigger frame 308. For example, the STA1 may transmit a response frame 312 via the first subchannel and the STA2 may transmit a response frame 314 via the second subchannel. In other words, the STA2 may switch to the second subchannel (as allocated, assigned, indicated, or designated to the STA2 via one or both of the DSO announcement frame 304 and the trigger frame 308) and respond with the response frame 314 in accordance with CCA-ED results. In some aspects, the response frame 312 and the response frame 314 may be examples of clear to send (CTS) frames sent via non-HT PPDUs.

Further, although illustrated and described in the context of being allocated one or more RUs associated with a single subchannel, the STA1 or the STA2 may be allocated one or more RUs in one or more subchannels. For example, one or more first RUs (such as one or more MU RUs) may be allocated to the STAT in a first subchannel and a second subchannel and one or more second RUs may be allocated to the STA2 in a third subchannel and a fourth subchannel. Further, the first subchannel and the second subchannel may be contiguous or may not be contiguous with each other. Similarly, the third subchannel and the fourth subchannel may be contiguous or may not be contiguous with each other. Each of one or more subchannels to which a STA may be allocated one or more associated RUs may include one or more 20 MHz channels. In some aspects, the one or more 20 MHz channels within a given allocated subchannel may be contiguous. In some other aspects, the one or more 20 MHz channels within a given allocated subchannel may not be contiguous. In such aspects, one or more 20 MHz channels within the allocated subchannel may be punctured.

In accordance with the STAT and the STA2 switching to the allocated subchannels and responding with the response frame 312 and the response frame 314, respectively, the AP 102, the STAT, and the STA2 may exchange one or more frames via the allocated subchannels in a single PPDU (such as an EHT MU PPDU). Additionally, or alternatively, the AP 102 and the STAs may exchange one or more frames via the allocated subchannels in an OFDMA PPDU. For example, the AP 102 (such as a logical or physical AP interface affiliated with the AP 102) and the STAT may exchange a data frame 316 via the first subchannel and the AP 102 (such as the logical or physical AP interface affiliated with the AP 102) and the STA2 may exchange a data frame 318 via the second subchannel, both of the data frame 316 and the data frame 318 being conveyed within a single PPDU. In some aspects, more than one SIFS-separated PPDUs may be exchanged within the DSO frame exchange 300.

In implementations in which the UL MU or the UL MU Data mode is enabled at both the STAT and the STA2, the AP 102 may transmit a block ACK request (BAR) frame after the data frames, or may implicitly request feedback (such as via an implied BA setting of the trigger frame 308), and the STAT and the STA2 may provide feedback associated with the data frame 316 and the data frame 318, respectively, via an ACK or a BA frame on the allocated subchannels. For example, the STAT may transmit an ACK or BA frame (such as a BA frame 320) associated with the data frame 316 via the first subchannel and the STA2 may transmit an ACK or BA frame associated with the data frame 318 via the second subchannel. In such implementations in which feedback is transmitted via the respectively allocated subchannels as part of the DSO frame exchange 300, STA2 may wait on (such as monitor) the second subchannel for a timeout interval after transmitting an ACK or BA frame prior to switching back to the first subchannel (such as the primary subchannel). Such a timeout interval may be equal to aSIFSTime+aSlotTime+aRxPhyStartDelay, which may be timing parameters communicated between the AP 102 and the STA2.

If the STA2 identifies, ascertains, or otherwise determines that no frame is addressed to the STA2 during the timeout interval, the STA2 may initiate a switch back to the first subchannel (such as a primary 20 MHz subchannel). After a DSO transition delay after the timeout interval, which may account for the time it takes the STA2 to switch from the second subchannel to the first subchannel, the STA2 may have parked a radio of the STA2 back on the first subchannel and may monitor for other communication on the first subchannel. In some implementations, the STA2 may support and signal, to the AP 102, at least two different DSO transition delays, with a first transition delay applicable to when the STA2 is switching from a primary subchannel (such as from a transmit or receive mode on the primary subchannel to a listening mode on the primary subchannel) and a second transition delay applicable to when the STA2 is switching from a secondary subchannel (such as from a transmit or receive mode on the secondary subchannel to a listening mode on the primary subchannel).

In some other implementations, such as in implementations in which an UL MU or an UL MU Data mode is disabled at one or both of the STA1 and the STA2, the data frame 316 and the data frame 318 may be examples of downlink data frames transmitted by the AP affiliated with the AP 102 to the STA1 and the STA2, respectively. In other words, the DSO frame exchange 300 may be limited to downlink communication in accordance with the UL MU or the UL MU Data mode being disabled at one or both of the STA1 and the STA2.

Further, and as illustrated in the example of FIG. 3, the AP 102 and the STA2 may support a modified DSO feedback mechanism in accordance with the UL MU or the UL MU Data mode being disabled at the STA2. For example, because DSO STAs with the UL MU or the UL MU Data mode disabled may not be able to generate TB PPDUs, such DSO STAs may be unable to transmit a BA frame via a secondary subchannel as part of the DSO frame exchange 300. Likewise, in some implementations, the AP 102 (such as a logical or physical AP interface affiliated with the AP 102) may not solicit a BA frame from the STA2 while the STA2 is operating on the secondary subchannel. In other words, the AP 102 may not transmit a BAR frame or an MU BAR frame to the STA2 while the STA2 is operating on the secondary subchannel and may not set an ACK policy associated with the data frame 318 to implicit BAR. Instead, the AP 102 may solicit feedback from the STA2 after the STA2 has switched back to the primary subchannel.

For example, while the STA1 may transmit the BA frame 320 (either in accordance with an implicit BAR ACK policy or in accordance with receiving a BAR frame from the AP 102) prior to any timeout or transition interval, the AP 102 may refrain from soliciting, via a BAR frame 322, a BA frame 324 from the STA2 until after a timeout interval 326 and a transition delay 328. For example, after STA2 receives the PPDU including the data frame 318, the STA2 may wait on (such as monitor) the secondary subchannel for the timeout interval 326 of aSIFSTime+aSlotTime+aRxPhyStartDelay and, if no other frame is addressed to STA2 during the timeout interval 326 and because the STA2 may not be allowed to transmit an ACK associated with the data frame 318, the STA2 may initiate a switch back to the primary subchannel (which may occur within the transition delay 328, which may be an example of a DSO transition delay). At the end of the transition delay 328, the STA2 may monitor for communication on the primary subchannel and, accordingly, the AP 102 may transmit the BAR frame 322 to solicit the BA frame 324 from the STA2 via the primary subchannel.

Alternatively, or additionally, in some implementations, the AP 102 may initiate a downlink transmission or a triggered uplink transmission by immediately preceding the frame with a single DSO Announcement frame that does not solicit an immediate response. In other words, the AP may not solicit a response to confirm that the DSO STA has completed the switch to the secondary subchannel and may instead directly initiate the downlink or triggered uplink transmission. In such implementations, wireless communication devices participating in the DSO frame exchange 300 may experience less signaling overhead, which may facilitate greater spectral efficiency and lower power consumption at the participating wireless communication devices.

After the DSO frame exchange 300, a non-AP STA/MLD (such as the STA2) may perform one or more operations in accordance with a communication mode or capability of the non-AP STA/MLD. For example, after the DSO frame exchange 300, a non-EMLSR device may switch back to operating on (such as transmitting via, receiving via, or monitoring on) a primary 20 MHz subchannel of the link on which the DSO frame exchange 300 occurred. An EMLSR device may perform one or more of various options after the DSO frame exchange 300.

In some implementations, an EMLSR device (such as an EMLSR STA) may switch back to a listening mode (such as a 1×1 listening operation or mode) on links of the EMLSR device that form an EMLSR link set (such as both the first link and the second link among possibly additional links not shown in the figure). In other words, the EMLSR device may switch back to the state in which the EMLSR device was at the beginning of the DSO frame exchange 300. In such implementations, to initiate another DSO frame exchange, the AP 102 and the EMLSR device may repeat the DSO frame exchange 300.

In some other implementations, an EMLSR device may switch back to a transmit or receive mode (such as a 2×2 operation) on the primary 20 MHz subchannel of the link on which the DSO frame exchange 300 ended. In such implementations, to initiate another DSO frame exchange, the AP 102 may refrain from transmitting an EMLSR ICF to the EMSLR device. For example, a second DSO frame exchange may be as if the EMLSR device was not in an EMLSR mode (as no EMLSR ICF may be used to trigger the EMLSR device to switch to a transmit or receive mode on a given link). Further, in such implementations, the AP may refrain from initiating a frame exchange sequence with the EMLSR device on the other EMLSR link(s) of the EMLSR device for at least a duration in which the EMLSR device stays in the transmit or receive mode on the EMLSR link on which the DSO frame exchange 300 occurred.

In accordance with switching to the transmit or receive mode on the primary 20 MHz subchannel of the DSO frame exchange link at the end of the DSO frame exchange 300, the EMLSR device may (at least effectively) temporarily disable the EMLSR mode. Accordingly, the EMLSR device and the AP may support a mechanism to allow the EMLSR device to re-enable the EMLSR mode. In some implementations, the EMLSR device may switch back to a listening mode (such as 1×1) after a timeout interval after the DSO frame exchange 300. Such a timeout interval may be, for example, a Beacon interval or a specific TSF value (which may be signaled between the EMLSR device and the AP 102).

Additionally, or alternatively, the EMLSR device may switch to a listening mode (1×1) after sending a frame to the AP 102 indicating that the EMLSR device is switching back to the listening mode. For example, if the EMLSR device transmits a frame via one of the other EMLSR link(s) (such as an EMLSR link other than the DSO frame exchange link), such a frame may serve as an indication that the EMLSR device is switching back to listening on the EMLSR links. Additionally, or alternatively, the EMLSR device may transmit the indication via the DSO frame exchange link (such as within an A-Control field of a frame in a DSO sequence, which may be the DSO frame exchange 300 or a later DSO frame exchange). In such examples, at the end of the DSO sequence, the EMLSR device may be in a listening mode (such as a 1×1 operation). Additionally, or alternatively, the EMLSR device may switch back to a listening mode in accordance with (such as after) receiving a frame from the AP 102 indicating the EMLSR device to switch back to the listening mode.

In some implementations, an EMLSR device or the AP 102 may signal or indicate whether the EMLSR device is to switch back to a listening mode on the EMLSR links or to switch to a transmit or receive mode on the primary 20 MHz subchannel of the link on which the DSO frame exchange 300 occurred. For example, an option for the EMLSR device to switch to the transmit or receive mode on the primary 20 MHz subchannel of the link on which the DSO frame exchange 300 occurred may be available by a request of the EMLSR device or the AP 102. In some aspects, the EMLSR device and the AP 102 may negotiate (such as via a frame exchange) the request.

In such implementations, if the EMLSR device prefers to switch to the primary 20 MHz subchannel of the DSO frame exchange link instead of switching back to the listening mode on the EMLSR links, the EMLSR device may request such operation in a frame that the EMLSR device transmits to the AP 102. The EMLSR device may transmit (such as indicate) such a request during association, mode enablement, or in any frame transmitted during the DSO frame exchange 300 (such as via an indication in an aggregated control (A-Control) field).

Although some of the aspects related to an EMLSR mode of operation are described herein with respect to two EMLSR links, the concepts may be extensible to more than two EMLSR links. Furthermore, the concepts also may be applicable in scenarios in which a wireless communication device (such as an EMLSR device or any other client wireless communication device) enables the EMLSR mode on only one EMLSR link. For example, the EMLSR device may enable the EMLSR mode on the first link and not on the second link.

Figure 4:
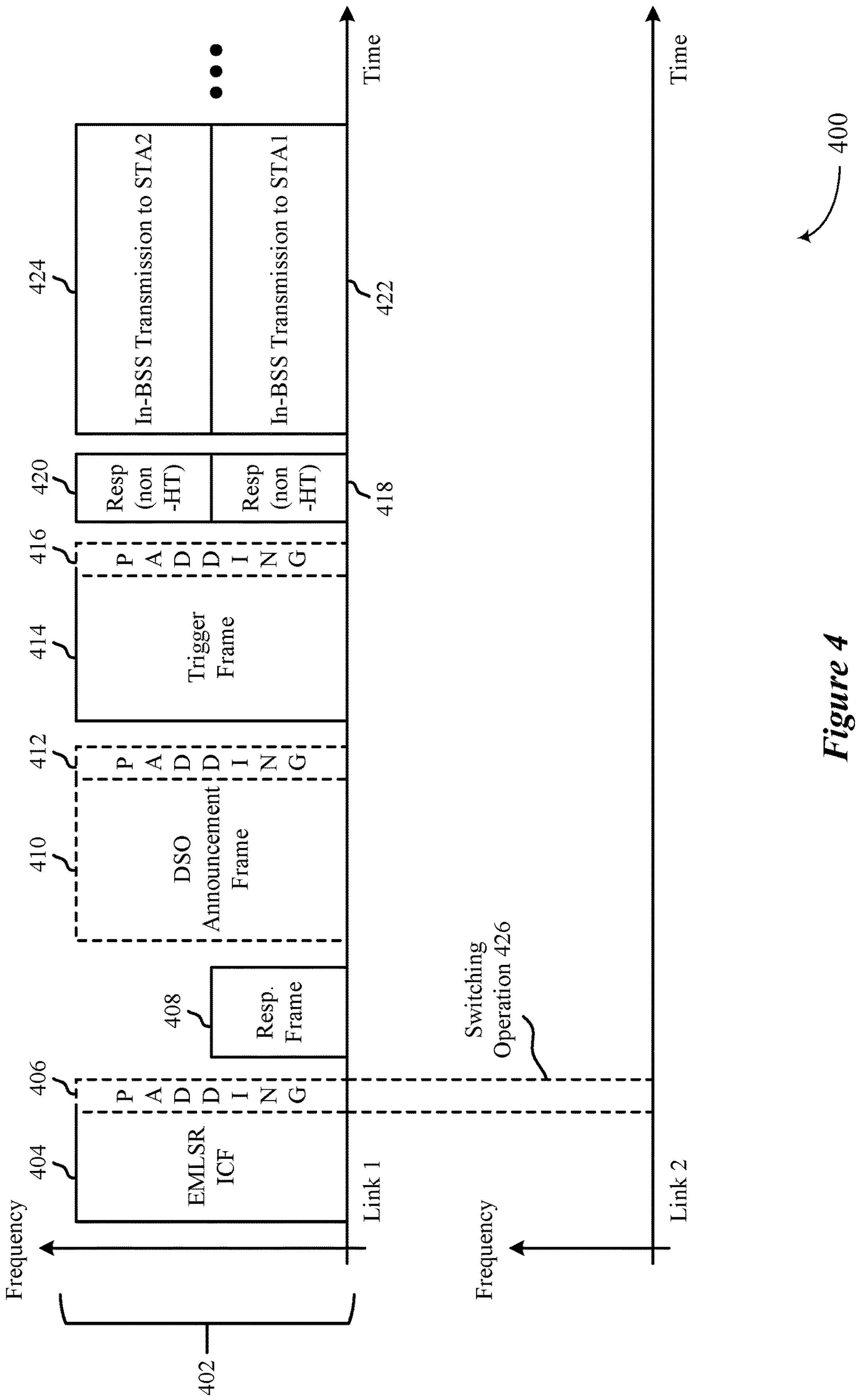

FIG. 4 shows an example DSO frame exchange 400 that supports addressing client constraints in DSO. The DSO frame exchange 400 (which may be equivalently understood or referred to as a DSO frame exchange sequence) may implement or be implemented to realize aspects of the wireless communication network 100 or the signaling diagram 200. For example, the DSO frame exchange 400 may illustrate communication between at least two wireless communication devices, such as at least the wireless communication device 202-*a* and the wireless communication device 202-*b* as illustrated by and described with reference to FIG. 2.

For example, the DSO frame exchange 400 may illustrate communication between an AP 102 (such as an AP MLD, such as the wireless communication device 202-*a*) and a STA1 and between the AP 102 and a STA2, with the STA1 or the STA2 being an example of a STA 104 affiliated with a non-AP MLD (such as the wireless communication device 202-*b*). The STA1 and the STA2 may operate on a first link (such as a link 1, which may be an example of the link 206-*a* as illustrated and described with reference to FIG. 2), with the first link and a second link (such as a link 2, which may be an example of the link 206-*b* as illustrated and described with reference to FIG. 2) forming, for example, an EMLSR link set of the non-AP MLD.

The DSO frame exchange 400, which may be associated with a channel access protocol across a BSS bandwidth 402 (such as a 160 MHz bandwidth or a 320 MHz bandwidth, among other examples), may be an example of a modified DSO frame exchange sequence that supports greater implementation simplicity by treating DSO and EMLSR as two separate operations. For example, the AP 102 may transmit an EMLSR ICF 404 to enable a non-AP MLD to switch to a transmit or receive mode (such as 2×2 or N×N) on the first link (such as one of the EMLSR links). In some aspects, the EMLSR ICF 404 may be an MU-RTS Trigger frame or a BSRP Trigger frame.

The AP 102 may transmit the EMLSR ICF 404 via the full bandwidth 402 or via a portion (such as a subset) of the bandwidth 402. In some implementations, the AP 102 may transmit the EMLSR ICF 404 via the full bandwidth 402 (such as a 160 MHz or a 320 MHz bandwidth), even if the AP 102 expects to receive a response via a portion of the bandwidth 402 (such as via an 80 MHz portion of the bandwidth 402). In such implementations, the AP 102 may transmit the EMLSR ICF 404 via the full bandwidth 402 in accordance with network bandwidth usage rules. For example, a STA (such as the AP 102) that acquires a TXOP may be allowed to reduce a bandwidth usage in subsequent frames, but may not be allowed to increase a bandwidth usage in subsequent frames. Thus, to perform the DSO frame exchange 400 in the entire bandwidth 402, the AP 102 may transmit the EMLSR ICF 404 via the entire bandwidth 402 (such as via a non-HT duplicate format). In some other implementations, the AP 102 may transmit the EMLSR ICF 404 via a portion of the bandwidth 402 (such as via an 80 MHz portion). In such implementations, the AP 102 may transmit the EMLSR ICF 404 via a portion of the bandwidth 402 in accordance with relaxed network bandwidth usage rules. For example, network bandwidth usage rules may specify how a STA (such as the AP 102) that acquires a TXOP may reduce a bandwidth usage in subsequent frames, but may not be allowed to increase a bandwidth usage in subsequent frames, except if the initiating frame is an EMLSR ICF (such as the EMLSR ICF 404) and the subsequent frames are part of a DSO frame exchange sequence (such as the DSO frame exchange 400).

The EMLSR ICF 404 may include a padding portion 406 to enable the non-AP MLD to switch to the transmit or receive mode. For example, the non-AP MLD may perform a switching operation 426 during the padding portion 406. Such a switching operation 426 may include switching from a listening mode (such as a 1×1 mode) to a transmit or receive mode (such as a 2×2 or N×N mode) on the first link (such as the link on which the EMLSR ICF 404 is received).

The STA on the first link may transmit a response frame 408 (such as a frame responsive to the EMLSR ICF 404). The response frame 408 may be a CTS frame or a buffer status report (BSR) frame. In some implementations, the non-AP MLD may transmit the response frame 408 in a portion (such as subset) of the bandwidth 402, such as an 80 MHz portion in examples in which the non-AP MLD is 80 MHz capable on the first link.

In some aspects, the AP 102 may transmit an initial frame of a DSO sequence a duration of SIFS after receiving the response frame 408. Such an initial frame of the DSO sequence may be a DSO announcement frame 410 or a trigger frame 414 (such as a DSO trigger frame, which may be understood as a DSO ICF). The initial frame may include an RU allocation and assign one or more RUs to the STA2 in the secondary subchannel. For example, if transmitted, the DSO announcement frame 410 may be addressed to the STA2 (such as only the STA2) and may signal the assignment (such as assigning the STA2 to the secondary 80 MHz). In some aspects, the DSO announcement frame 410 may include a padding portion 412, which may provide time for the STA2 to switch from the primary subchannel to the secondary 80 MHz. The DSO announcement frame 410 may be associated with a non-HT duplicate PPDU.

The AP 102 may transmit the trigger frame 414 (such as an MU-RTS Trigger frame or a BSRP Trigger frame) and the trigger frame 414 may allocate one or more RUs to the STA1 and the STA2. In implementations in which the DSO announcement frame 410 is transmitted and includes the padding portion 412, the AP 102 may refrain from including the padding portion 416 in the trigger frame 414 because sufficient padding delay may already be provided by the padding portion 412. Alternatively, in implementations in which the STA1 allocated one or more RUs on the primary subchannel is an EHT EMLSR STA, the AP 102 may include the padding portion 416 in the trigger frame 414 to account for the padding delay associated with the EMLSR STA to switch from listening mode to a transmit or receive mode, regardless of whether the DSO announcement frame 410 was transmitted with or without the padding portion 412.

In accordance with receiving the trigger frame 414, each of the STA1 and the STA2 may perform a CCA-ED during an SIFS after the trigger frame 414 (and, if included, after the padding portion 416 of the trigger frame 414) on the allocated subchannels. In some implementations, one or more of the STA1 and the STA2 may perform CCA-ED during an SIFS after the trigger frame 414 on a 20 MHz anchor channel associated with the allocated subchannel (such as only on a 20 MHz anchor channel associated with the allocated subchannel). In some aspects, the STA1 and the STA2 may perform the CCA-ED to measure whether the allocated subchannels are available (such as not occupied by other wireless communication devices). If the CCA-ED is successful (such as indicative of less than or equal to a threshold interference), the STA1 and the STA2 may transmit response frames associated with the trigger frame 414. For example, the STA1 may transmit a response frame 418 via the first subchannel and the STA2 may transmit a response frame 420 via the second subchannel. In other words, the STA2 may switch to the second subchannel (as allocated, assigned, indicated, or designated to the STA2 via one or both of the DSO announcement frame 410 and the trigger frame 414) and respond with the response frame 420 in accordance with CCA-ED results. In some aspects, the response frame 418 and the response frame 420 may be examples of CTS frames sent via non-HT PPDUs.

In accordance with the STA1 and the STA2 switching to the allocated subchannels and responding with the response frame 418 and the response frame 420, respectively, the AP 102, the STA1, and the STA2 may exchange one or more frames via the allocated subchannels in a single PPDU (such as an EHT MU PPDU). Additionally, or alternatively, the AP 102 and the STAs may exchange one or more frames via the allocated subchannels in an OFDMA PPDU (such as an HE MU PPDU, EHT MU PPDU, or an UHR MU PPDU). For example, the AP 102 (such as a logical or physical AP interface affiliated with the AP 102) and the STA1 may exchange a data frame 422 via the first subchannel and the AP 102 (such as a logical or physical AP interface affiliated with the AP 102) and the STA2 may exchange a data frame 424 via the second subchannel, both of the data frame 422 and the data frame 424 being conveyed within a single PPDU. In some aspects, more than one SIFS-separated PPDUs may be exchanged within the DSO frame exchange 400.

In implementations in which the UL MU or the UL MU Data mode is enabled at both the STA1 and the STA2, the AP 102 may transmit a BAR frame (such as an MU BAR frame) after the data frames, or may implicitly request feedback (such as via an implied BA setting of the trigger frame 414), and the STA1 and the STA2 may provide feedback associated with the data frame 422 and the data frame 424, respectively, via an ACK or a BA frame on the allocated subchannels. For example, the STA1 may transmit an ACK or BA frame associated with the data frame 422 via the first subchannel and the STA2 may transmit an ACK or BA frame associated with the data frame 424 via the second subchannel. In some aspects, the STA1 and the STA2 may transmit their respective ACKs or BA frames simultaneously (such as during a fully or partially overlapping time period). In implementations in which feedback is transmitted via the respectively allocated subchannels as part of the DSO frame exchange 400, the STA2 may wait on (such as monitor) the second subchannel for a timeout interval after transmitting an ACK or BA frame prior to switching back to the first subchannel (such as the primary subchannel). Such a timeout interval may be equal to aSIFSTime+aSlotTime+aRxPhyStartDelay, which may be timing parameters communicated between the AP 102 and the STA2.

If the STA2 identifies, ascertains, or otherwise determines that no frame is addressed to the STA2 during the timeout interval, the STA2 may initiate a switch back to the first subchannel (such as a primary 20 MHz subchannel). After a DSO transition delay after the timeout interval, which may account for the time it takes the STA2 to switch from the second subchannel to the first subchannel, the STA2 may have parked (such as tuned) a radio of the STA2 back on the first subchannel and may monitor for other communication on the first subchannel. In some implementations, the STA2 may support and signal, to the AP 102, at least two different DSO transition delays, with a first transition delay applicable to when the STA2 is switching from a primary subchannel (such as from a transmit or receive mode on the primary subchannel to a listening mode on the primary subchannel) and a second transition delay applicable to when the STA2 is switching from a secondary subchannel (such as from a transmit or receive mode on the secondary subchannel to a listening mode on the primary subchannel).

In some implementations, if no frame is addressed to the STA2 during the timeout interval of the STA2, a non-AP MLD with which the STA2 is affiliated may switch to a listening mode (such as a 1×1 mode) on both the first link and the second link. In some other implementations, if no frame is addressed to the STA2 during the timeout interval of the STA2, the STA2 may switch back to a transmit or receive mode (such as a 2×2 or N×N mode) on the first link. Similarly, if no frame is addressed to the STA1 during the timeout interval of the STA1, a non-AP MLD with which the STA1 is affiliated may switch to a listening mode (such as a 1×1 mode) on both the first link and the second link. In some other implementations, if no frame is addressed to the STA1 during the timeout interval of the STA1, the STA1 may switch back to a transmit or receive mode (such as a 2×2 or an N×N mode) on the first link.

Figure 5:
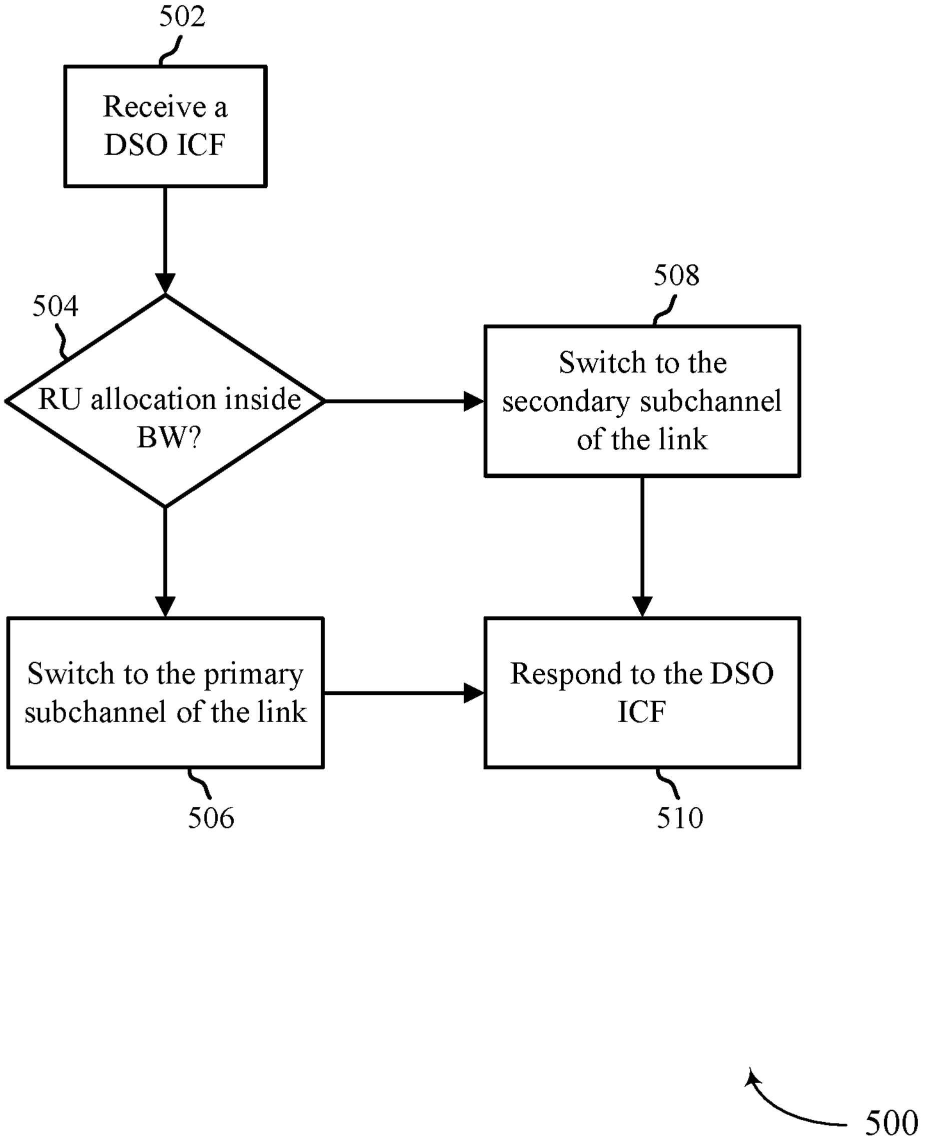
FIGS. 5 and 6 show example flowcharts that support addressing client constraints in DSO.

FIG. 5 shows an example flowchart 500 that supports addressing client constraints in dynamic subchannel operation. The flowchart 500 may implement or be implemented to realize aspects of the wireless communication network 100, the signaling diagram 200, or the DSO frame exchange 300. For example, the flowchart 500 may illustrate a sequence of signaling and processing steps performed by or at the wireless communication device 202-*b* (as illustrated by and described with reference to FIG. 2) to support a DSO frame exchange with a simultaneously enabled EMLSR/EMLMR mode. In other words, the steps of the flowchart 500 may be associated with a behavior of an EMLSR/EMLMR STA affiliated with the wireless communication device 202-*b*. In some aspects, the flowchart 500 may illustrate a sequence of signaling and processing steps performed by or at the wireless communication device 202-*b* to support a DSO frame exchange without an announcement frame.

At 502, the EMLSR/EMLMR STA may receive a DSO ICF, which may be understood as a trigger frame associated with a DSO frame exchange. In some implementations, the EMLSR/EMLMR STA may interpret the DSO ICF as an ICF associated with the EMLSR/EMLMR communication mode and may use the EMLSR/EMLMR ICF to indicate both a link to which the EMLSR/EMLMR STA is to switch (to a 2×2 mode) and a subchannel via which the EMLSR/EMLMR STA is to communicate.

At 504, for example, the EMLSR/EMLMR STA may decode the DSO ICF and identify, ascertain, or otherwise determine whether an RU allocation provided by (such as indicated by) the DSO ICF is within an operating bandwidth (referred to as “BW” in the example of the flowchart 500) of the EMLSR/EMLMR STA. The EMLSR/EMLMR STA may switch (to a 2×2 mode, such as a transmit mode) on the subchannel indicated by the DSO ICF.

At 506, for example, the EMLSR/EMLMR STA may switch to a transmit mode on the primary subchannel of the link on which the DSO ICF is received. In some implementations, the DSO ICF may trigger the EMLSR/EMLMR STA to switch to the transmit mode on the primary subchannel of the link on which the DSO ICF is received in accordance with indicating an RU associated with the primary subchannel of the link.

Alternatively, at 508, the EMLSR/EMLMR STA may switch to a transmit mode on the secondary subchannel of the link on which the DSO ICF is received. In some implementations, the DSO ICF may trigger the EMLSR/EMLMR STA to switch to the transmit mode on the secondary subchannel of the link on which the DSO ICF is received in accordance with indicating an RU associated with the secondary subchannel of the link.

In either case, at 510, the EMLSR/EMLMR STA may respond to the DSO ICF. For example, the EMLSR/EMLMR STA may transmit a response to the DSO ICF via the allocated subchannel and via the link on which the DSO ICF is received after switching to the transmit mode on the allocated subchannel associated with the link on which the DSO ICF is received.

Figure 6:
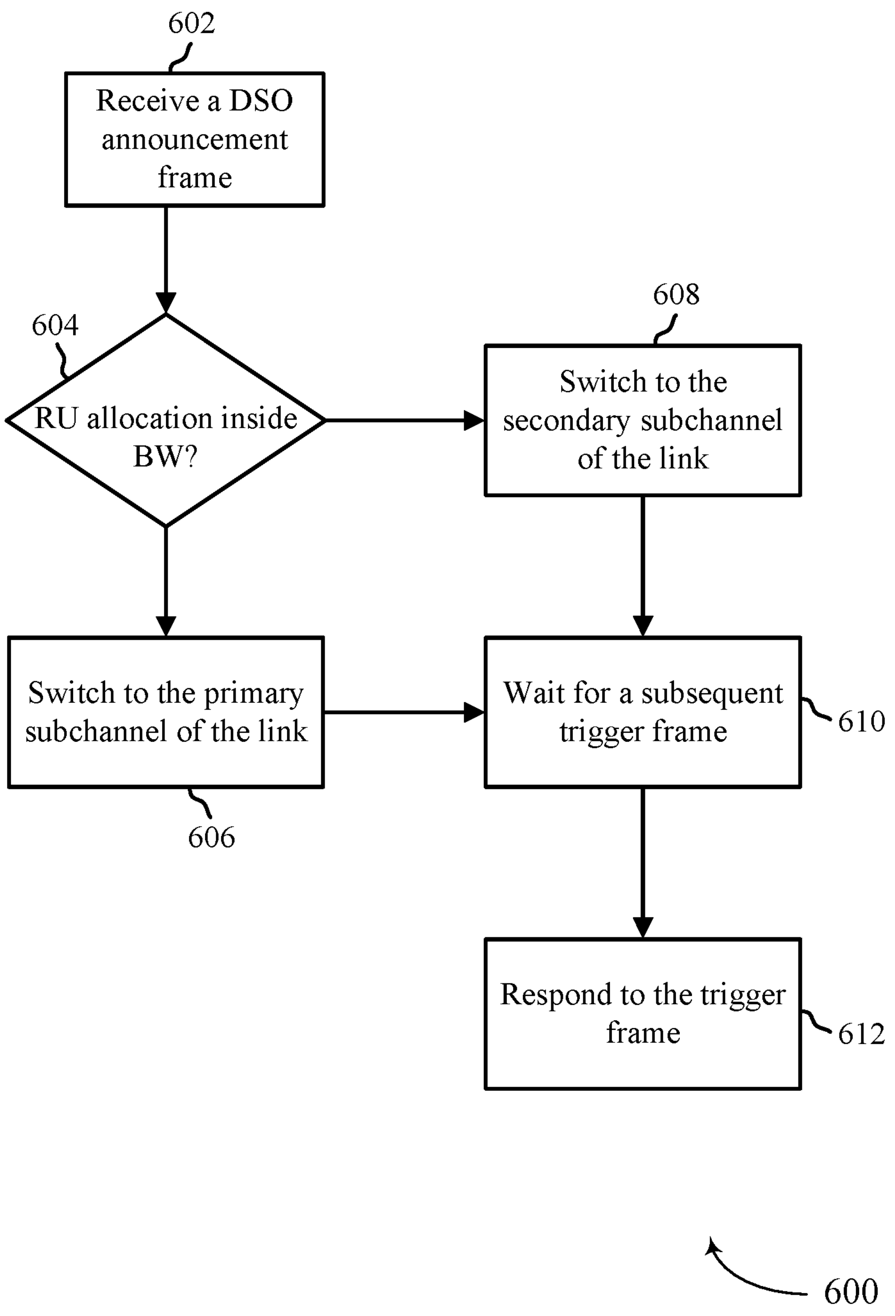

FIG. 6 shows an example flowchart 600 that supports addressing client constraints in DSO. The flowchart 600 may implement or be implemented to realize aspects of the wireless communication network 100, the signaling diagram 200, or the DSO frame exchange 300. For example, the flowchart 600 may illustrate a sequence of signaling and processing steps performed by or at the wireless communication device 202-*b* (as illustrated by and described with reference to FIG. 2) to support a DSO frame exchange with a simultaneously enabled EMLSR/EMLMR mode. In other words, the steps of the flowchart 600 may be associated with a behavior of an EMLSR/EMLMR STA affiliated with the wireless communication device 202-*b*. In some aspects, the flowchart 600 may illustrate a sequence of signaling and processing steps performed by or at the wireless communication device 202-*b* to support a DSO frame exchange with an announcement frame.

At 602, the EMLSR/EMLMR STA may receive a DSO announcement frame associated with the DSO frame exchange. In some implementations, the EMLSR/EMLMR STA may interpret the DSO announcement frame as an ICF associated with the EMLSR/EMLMR communication mode and may use the EMLSR/EMLMR ICF to indicate both a link to which the EMLSR/EMLMR STA is to switch (to a 2×2 mode) and a subchannel via which the EMLSR/EMLMR STA is to communicate.

At 604, for example, the EMLSR/EMLMR STA may decode the DSO announcement frame and identify, ascertain, or otherwise determine whether an RU allocation provided by (such as indicated by) the DSO announcement frame is within an operating bandwidth (referred to as “BW” in the example of the flowchart 600) of the EMLSR/EMLMR STA. The EMLSR/EMLMR STA may switch (to a 2×2 mode, such as a receive mode) on the subchannel indicated by the DSO announcement frame.

At 606, for example, the EMLSR/EMLMR STA may switch to a receive mode on the primary subchannel of the link on which the DSO announcement frame is received. In some implementations, the DSO announcement frame may trigger the EMLSR/EMLMR STA to switch to the receive mode on the primary subchannel of the link on which the DSO announcement frame is received in accordance with indicating an RU associated with the primary subchannel of the link.

Alternatively, at 608, the EMLSR/EMLMR STA may switch to a receive mode on the secondary subchannel of the link on which the DSO announcement frame is received. In some implementations, the DSO announcement frame may trigger the EMLSR/EMLMR STA to switch to the receive mode on the secondary subchannel of the link on which the DSO announcement is received in accordance with indicating an RU associated with the secondary subchannel of the link.

In either case, at 610, the EMLSR/EMLMR STA may monitor the allocated subchannel of the link on which the DSO announcement frame is received. For example, the EMLSR/EMLMR STA may wait for (such as monitor for) a subsequent trigger frame associated with the DSO frame exchange in accordance with switching to the allocated subchannel of the link on which the DSO announcement frame is received.

At 612, the EMLSR/EMLMR STA may receive and respond to the trigger frame associated with the DSO frame exchange. In some examples, the trigger frame may trigger the EMLSR/EMLMR STA to switch to a transmit mode on the allocated subchannel of the link on which the DSO announcement frame is received and the EMLSR/EMLMR STA may transmit the response to the trigger frame in accordance with switching to the transmit mode. For example, the EMLSR/EMLMR STA may transmit a response to the trigger frame via the allocated subchannel and via the link on which the DSO announcement frame is received after switching to the transmit mode on the allocated subchannel associated with the link on which the DSO announcement frame is received.

Figure 7:
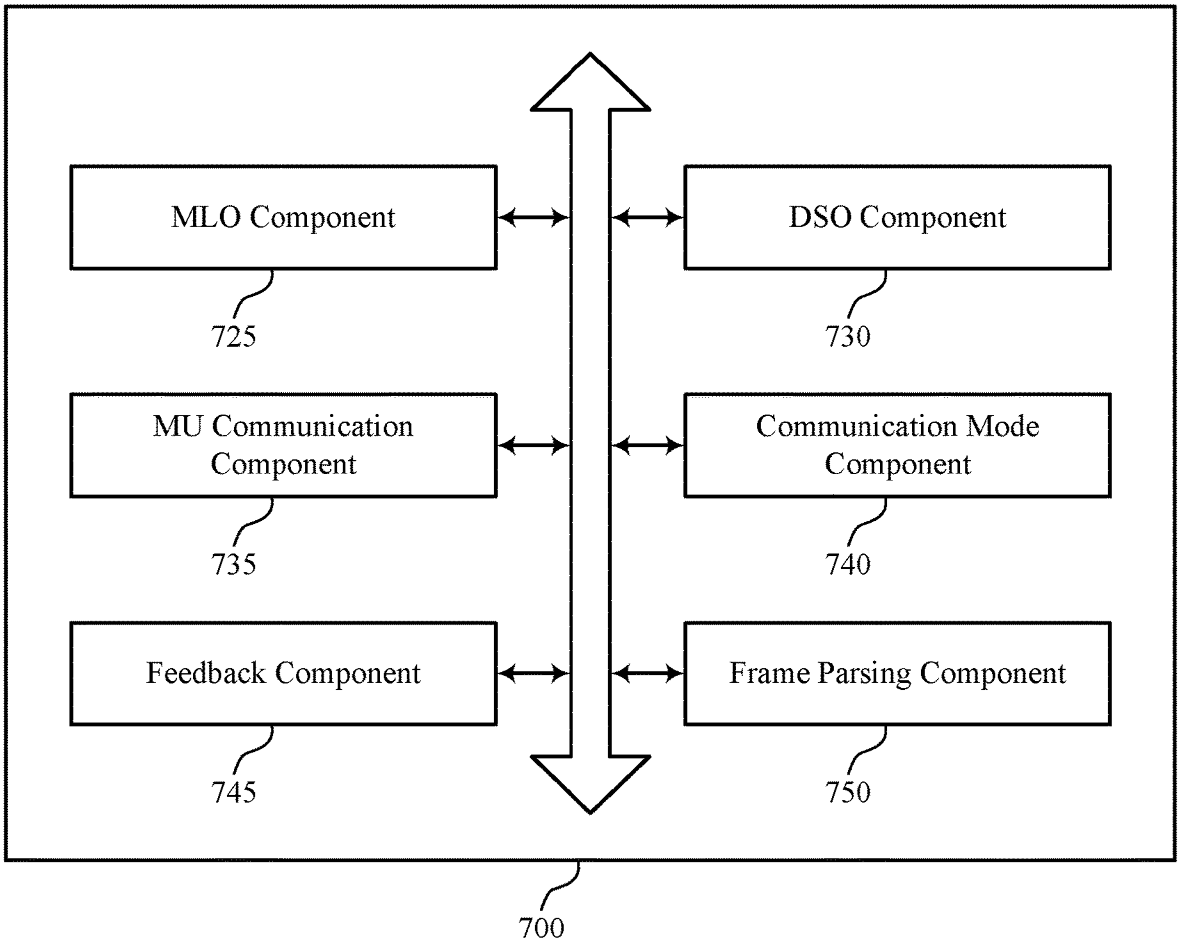
FIGS. 7 and 8 show block diagrams of example wireless communication devices that support addressing client constraints in DSO.

FIG. 7 shows a block diagram of an example wireless communication device 700 that supports addressing client constraints in dynamic subchannel operation. In some examples, the wireless communication device 700 is configured to perform the processes 900 and 1000 described with reference to FIGS. 9 and 10, respectively. The wireless communication device 700 may include one or more chips, SoCs, chipsets, packages, components or devices that individually or collectively constitute or include a processing system. The processing system may interface with other components of the wireless communication device 700, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 700 may transmit the information output from the chip. In such an example, the second interface may refer to an interface between the processing system of the chip and a reception component, such that the wireless communication device 700 may receive information that is then passed to the processing system. In some such examples, the first interface also may obtain information, such as from the transmission component, and the second interface also may output information, such as to the reception component.

The processing system of the wireless communication device 700 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 700 can configurable or configured for use in a STA, such as the STA 104 described with reference to FIG. 1. In some other examples, the wireless communication device 700 can be a STA that includes such a processing system and other components including multiple antennas. The wireless communication device 700 is capable of transmitting and receiving wireless communications in the form of, for example, wireless packets. For example, the wireless communication device 700 can be configurable or configured to transmit and receive packets in the form of physical layer PPDUs and MPDUs conforming to one or more of the IEEE 802.11 family of wireless communication protocol standards. In some other examples, the wireless communication device 700 can be configurable or configured to transmit and receive signals and communications conforming to one or more 3GPP specifications including those for 5G NR or 6G. In some examples, the wireless communication device 700 also includes or can be coupled with one or more application processors which may be further coupled with one or more other memories. In some examples, the wireless communication device 700 further includes a user interface (UI) (such as a touchscreen or keypad) and a display, which may be integrated with the UI to form a touchscreen display that is coupled with the processing system. In some examples, the wireless communication device 700 may further include one or more sensors such as, for example, one or more inertial sensors, accelerometers, temperature sensors, pressure sensors, or altitude sensors, that are coupled with the processing system.

The wireless communication device 700 includes an MLO component 725, a DSO component 730, a MU communication component 735, a communication mode component 740, a feedback component 745, and a frame parsing component 750. Portions of one or more of the MLO component 725, the DSO component 730, the MU communication component 735, the communication mode component 740, the feedback component 745, and the frame parsing component 750 may be implemented at least in part in hardware or firmware. For example, one or more of the MLO component 725, the DSO component 730, the MU communication component 735, the communication mode component 740, the feedback component 745, and the frame parsing component 750 may be implemented at least in part by at least a processor or a modem. In some examples, portions of one or more of the MLO component 725, the DSO component 730, the MU communication component 735, the communication mode component 740, the feedback component 745, and the frame parsing component 750 may be implemented at least in part by a processor and software in the form of processor-executable code stored in memory.

The wireless communication device 700 may support wireless communication in accordance with examples as disclosed herein. The MLO component 725 is configurable or configured to transmit a first frame including an indication that the wireless communication device is operating in accordance with a communication mode associated with one or more constraints on multi-link operation (MLO) at the wireless communication device. The DSO component 730 is configurable or configured to receive, via a first link associated with the MLO at the wireless communication device, a second frame associated with a dynamic subchannel operation (DSO) frame exchange on the first link, where the second frame allocates, to the wireless communication device, one or more resource units (RUs) associated with a subchannel of the first link. In some examples, the DSO component 730 is configurable or configured to communicating, via the one or more RUs associate with the subchannel of the first link, a third frame in accordance with the DSO frame exchange and the communication mode.

In some examples, to support communicating the third frame, the DSO component 730 is configurable or configured to transmit the third frame as a response to the second frame, where the second frame is a trigger frame associated with the DSO frame exchange.

In some examples, the communication mode component 740 is configurable or configured to switch to a transmit mode on the subchannel of the first link in association with the second frame allocating the one or more RUs associated with the subchannel of the first link, where the third frame is transmitted after switching to the transmit mode on the subchannel of the first link.

In some examples, the frame parsing component 750 is configurable or configured to interpret the second frame as an initial control frame of the communication mode, where transmitting the third frame after switching to the transmit mode on the subchannel of the first link is in association with interpreting the second frame as the initial control frame of the communication mode.

In some examples, to support communicating the third frame, the DSO component 730 is configurable or configured to receive the third frame via the one or more RUs associated with the subchannel of the first link, where the second frame is an announcement frame associated with the DSO frame exchange, and where the third frame is a trigger frame associated with the DSO frame exchange.

In some examples, the communication mode component 740 is configurable or configured to switch to a receive mode on the subchannel of the first link in association with the second frame allocating the one or more RUs associated with the subchannel of the first link, where the third frame is received after switching to the receive mode on the subchannel of the first link.

In some examples, the frame parsing component 750 is configurable or configured to interpret the second frame as an initial control frame of the communication mode, where receiving the third frame after switching to the receive mode on the subchannel of the first link is in association with interpreting the second frame as the initial control frame of the communication mode.

In some examples, the DSO component 730 is configurable or configured to transmit, via the one or more RUs associated with the subchannel of the first link, a fourth frame as a response to the third frame.

In some examples, the communication mode component 740 is configurable or configured to switch to a transmit mode on the subchannel of the first link in association with receiving the third frame, where the fourth frame is transmitted after switching to the transmit mode on the subchannel of the first link.

In some examples, the DSO component 730 is configurable or configured to transmit, via a STA affiliated with the wireless communication device, an indication that the STA supports the DSO frame exchange on the first link, where the indication that the STA supports the DSO frame exchange on the first link is independent from the indication that the wireless communication device is operating in accordance with the communication mode.

In some examples, the DSO component 730 is configurable or configured to transmit, via a fourth frame, information indicative of multiple sets of padding delay and transition delay in association with operating in accordance with the communication mode and supporting the DSO frame exchange on the first link, where communication via the one or more RUs associated with the subchannel of the first link is in accordance with at least one of the multiple sets of padding delay and transition delay.

In some examples, the multiple sets of padding delay and transition delay include a first set including a first padding delay and a first transition delay. In some examples, the first padding delay and the first transition delay be associated with a switch to a primary subchannel of the first link. In some examples, a padding portion of the second frame be associated with the first padding delay in accordance with the subchannel being the primary subchannel, and a second set including a second padding delay and a second transition delay. In some examples, the second padding delay and the second transition delay be associated with a switch to a secondary subchannel of the first link. In some examples, the padding portion of the second frame be associated with the second padding delay in accordance with the subchannel being the secondary subchannel.

In some examples, the first padding delay and the first transition delay be included in a first set of one or more fields of the fourth frame. In some examples, the second padding delay and the second transition delay be included in a second set of one or more fields of the fourth frame.

In some examples, the fourth frame is an association frame, and the DSO component 730 is configurable or configured to transmit, after association with an AP MLD, updated versions of the multiple sets of padding delay and transition delay via a fifth frame.

In some examples, the subchannel be a primary subchannel of the first link in accordance with the wireless communication device operating in accordance with the communication mode.

In some examples, the subchannel be a secondary subchannel of the first link, the secondary subchannel being outside of an operating bandwidth of the wireless communication device on the first link.

In some examples, the communication mode be an enhanced multi-link single-radio (EMLSR) mode or an enhanced multi-link multi-radio (EMLMR) mode. In some examples, the one or more constraints on the MLO at the wireless communication device include a constraint to communicate via a link on which an initial control frame is received.

In some examples, the first frame be an enhanced multi-link (EML) operating mode notification frame that enables the EMLSR mode or the EMLMR mode.

In some examples, the one or more constraints on the MLO at the wireless communication device include a constraint from communicating via the first link and a second link simultaneously.

In some examples, the first link and the second link form an enhanced multi-link single-radio (EMLSR) link set of the wireless communication device.

Additionally, or alternatively, the wireless communication device 700 may support wireless communication in accordance with examples as disclosed herein. The MU communication component 735 is configurable or configured to transmit a frame including an indication that the wireless communication device has disabled a communication mode associated with uplink multi-user (MU) communication. In some examples, the DSO component 730 is configurable or configured to receive, in accordance with the indication that the wireless communication device has disabled the communication mode, a trigger frame associated with a dynamic subchannel operation (DSO) frame exchange, where the trigger frame allocates, to the wireless communication device, one or more resource units (RUs) associated with a subchannel. In some examples, the DSO component 730 is configurable or configured to receive, via the one or more RUs associated with the subchannel, a data frame in accordance with the DSO frame exchange and the indication that the wireless communication device has disabled the communication mode.

In some examples, the DSO frame exchange be exclusively associated with downlink communication to the wireless communication device in accordance with the indication that the wireless communication device has disabled the communication mode.

In some examples, the trigger frame be an MU-request to send (RTS) frame type in accordance with the indication that the wireless communication device has disabled the communication mode.

In some examples, the DSO component 730 is configurable or configured to receive an announcement frame associated with the DSO frame exchange, where the announcement frame is an MU-request to send (RTS) frame type in accordance with the indication that the wireless communication device has disabled the communication mode.

In some examples, the DSO component 730 is configurable or configured to receive the data frame via a secondary subchannel, where the subchannel includes the secondary subchannel. In some examples, the communication mode component 740 is configurable or configured to switch from the secondary subchannel to a primary subchannel in accordance with an absence of communication to the wireless communication device for a threshold time period after the data frame. In some examples, the DSO component 730 is configurable or configured to receive a request for feedback associated with the data frame via the primary subchannel after switching from the secondary subchannel to the primary subchannel.

In some examples, the feedback component 745 is configurable or configured to transmit, in association with receiving the request, an acknowledgement frame or a block acknowledgement (BA) frame including the feedback associated with the data frame via the primary subchannel.

In some examples, the request for the feedback associate with the data frame is received via the primary subchannel in accordance with the indication that the wireless communication device has disabled the communication mode.

In some examples, the indication that the wireless communication device have disabled the communication mode associated with the uplink MU communication is associated with a disabled uplink MU operation or a disabled uplink MU data operation, or both.

Figure 8:
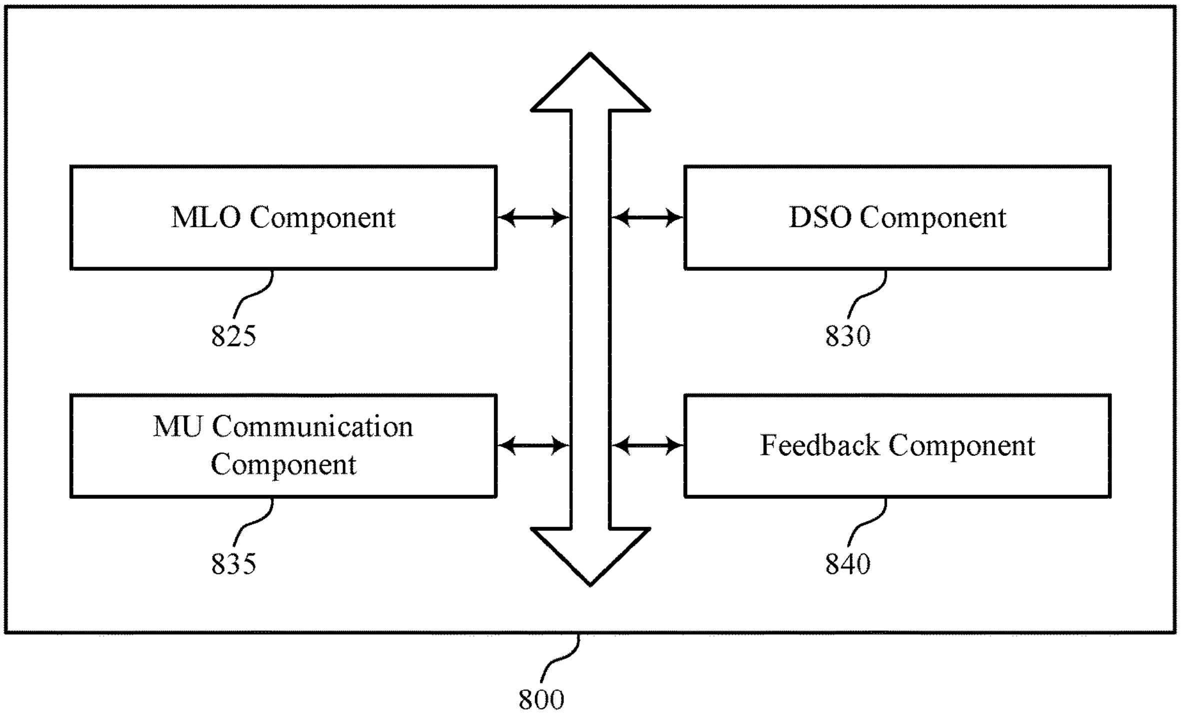

FIG. 8 shows a block diagram of an example wireless communication device 800 that supports addressing client constraints in dynamic subchannel operation. In some examples, the wireless communication device 800 is configured to perform the processes 1100 and 1200 described with reference to FIGS. 11 and 12, respectively. The wireless communication device 800 may include one or more chips, SoCs, chipsets, packages, components or devices that individually or collectively constitute or include a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 800 may transmit the information output from the chip. In such an example, the second interface may refer to an interface between the processing system of the chip and a reception component, such that the wireless communication device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 800 can configurable or configured for use in an AP, such as the AP 102 described with reference to FIG. 1. In some other examples, the wireless communication device 800 can be an AP that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some examples, the wireless communication device 800 also includes or can be coupled with one or more application processors which may be further coupled with one or more other memories. In some examples, the wireless communication device 800 further includes at least one external network interface coupled with the processing system that enables communication with a core network or backhaul network that enables the wireless communication device 800 to gain access to external networks including the Internet.

The wireless communication device 800 includes an MLO component 825, a DSO component 830, a MU communication component 835, and a feedback component 840. Portions of one or more of the MLO component 825, the DSO component 830, the MU communication component 835, and the feedback component 840 may be implemented at least in part in hardware or firmware. For example, one or more of the MLO component 825, the DSO component 830, the MU communication component 835, and the feedback component 840 may be implemented at least in part by at least a processor or a modem. In some examples, portions of one or more of the MLO component 825, the DSO component 830, the MU communication component 835, and the feedback component 840 may be implemented at least in part by a processor and software in the form of processor-executable code stored in memory.

The wireless communication device 800 may support wireless communication in accordance with examples as disclosed herein. The MLO component 825 is configurable or configured to receive a first frame including an indication that a second wireless communication device is operating in accordance with a communication mode associated with one or more constraints on multi-link operation (MLO) at the second wireless communication device. The DSO component 830 is configurable or configured to transmit, via a first link associated with the MLO at the second wireless communication device, a second frame associated with a dynamic subchannel operation (DSO) frame exchange on the first link, where the second frame allocates, to the second wireless communication device, one or more resource units (RUs) associated with a subchannel of the first link. In some examples, the DSO component 830 is configurable or configured to communicating, via the one or more RUs associate with the subchannel of the first link, a third frame in accordance with the DSO frame exchange and the communication mode.

In some examples, to support communicating the third frame, the DSO component 830 is configurable or configured to receive the third frame as a response to the second frame, where the second frame is a trigger frame associated with the DSO frame exchange.

In some examples, the second frame trigger the second wireless communication device to switch to a transmit mode on the subchannel of the first link. In some examples, the second frame be transmitted as an initial control frame of the communication mode in accordance with receiving the indication that the second wireless communication device is operating in accordance with the communication mode.

In some examples, to support communicating the third frame, the DSO component 830 is configurable or configured to transmit the third frame via the one or more RUs associated with the subchannel of the first link, where the second frame is an announcement frame associated with the DSO frame exchange, and where the third frame is a trigger frame associated with the DSO frame exchange.

In some examples, the second frame trigger the second wireless communication device to switch to a receive mode on the subchannel of the first link. In some examples, the second frame be transmitted as an initial control frame of the communication mode in accordance with receiving the indication that the second wireless communication device is operating in accordance with the communication mode.

In some examples, the DSO component 830 is configurable or configured to receive, via the one or more RUs associated with the subchannel of the first link, a fourth frame as a response to the third frame.

In some examples, the third frame trigger the second wireless communication device to switch to a transmit mode on the subchannel of the first link.

In some examples, the DSO component 830 is configurable or configured to receive, from a STA affiliated with the second wireless communication device, an indication that the STA supports the DSO frame exchange on the first link, where the indication that the STA supports the DSO frame exchange on the first link is independent from the indication that the second wireless communication device is operating in accordance with the communication mode.

In some examples, the DSO component 830 is configurable or configured to receive, via a fourth frame, information indicative of multiple sets of padding delay and transition delay in association with receiving the indication that the second wireless communication device operates in accordance with the communication mode and supports the DSO frame exchange on the first link, where communication via the one or more RUs associated with the subchannel of the first link is in accordance with at least one of the multiple sets of padding delay and transition delay.

In some examples, the multiple sets of padding delay and transition delay include a first set including a first padding delay and a first transition delay. In some examples, the first padding delay and the first transition delay be associated with a switch to a primary subchannel of the first link at the second wireless communication device. In some examples, a padding portion of the second frame be associated with the first padding delay in accordance with the subchannel being the primary subchannel, and a second set including a second padding delay and a second transition delay. In some examples, the second padding delay and the second transition delay be associated with a switch to a secondary subchannel of the first link at the second wireless communication device. In some examples, the padding portion of the second frame be associated with the second padding delay in accordance with the subchannel being the secondary subchannel.

In some examples, the first padding delay and the first transition delay be included in a first set of one or more fields of the fourth frame. In some examples, the second padding delay and the second transition delay be included in a second set of one or more fields of the fourth frame.

In some examples, the fourth frame is an association frame, and the DSO component 830 is configurable or configured to receive, after association with the second wireless communication device, updated versions of the multiple sets of padding delay and transition delay via a fifth frame.

In some examples, the subchannel be a primary subchannel of the first link in accordance with the second wireless communication device operating in accordance with the communication mode.

In some examples, the DSO component 830 is configurable or configured to transmit, via a trigger frame associated with the DSO frame exchange, a padding portion associated a padding delay of the second wireless communication device to switch from a listening mode on the primary subchannel to a transmit or receive mode on the primary subchannel, where the padding portion is included in the trigger frame in accordance with the second wireless communication device being an extremely high throughput (EHT) device.

In some examples, the subchannel be a secondary subchannel of the first link, the secondary subchannel being outside of an operating bandwidth of the second wireless communication device on the first link.

In some examples, the communication mode be an enhanced multi-link single-radio (EMLSR) mode or an enhanced multi-link multi-radio (EMLMR) mode. In some examples, the one or more constraints on the MLO at the second wireless communication device include a constraint to communicate via a link on which an initial control frame is received.

In some examples, the first frame be an enhanced multi-link (EML) operating mode notification frame that enables the EMLSR mode or the EMLMR mode.

In some examples, the one or more constraints on the MLO at the wireless communication device include a constraint from communicating via the first link and a second link simultaneously.

In some examples, the first link and the second link form an enhanced multi-link single-radio (EMLSR) link set of the second wireless communication device.

Additionally, or alternatively, the wireless communication device 800 may support wireless communication in accordance with examples as disclosed herein. The MU communication component 835 is configurable or configured to receive a frame including an indication that a second wireless communication device has disabled a communication mode associated with uplink multi-user (MU) communication. In some examples, the DSO component 830 is configurable or configured to transmit, in accordance with the indication that the second wireless communication device has disabled the communication mode, a trigger frame associated with a dynamic subchannel operation (DSO) frame exchange, where the trigger frame allocates, to the second wireless communication device, one or more resource units (RUs) associated with a subchannel. In some examples, the DSO component 830 is configurable or configured to transmit, via the one or more RUs associated with the subchannel, a data frame in accordance with the DSO frame exchange and the indication that the second wireless communication device has disabled the communication mode.

In some examples, the DSO frame exchange be exclusively associated with downlink communication to the second wireless communication device in accordance with the indication that the second wireless communication device has disabled the communication mode.

In some examples, the trigger frame be an MU-request to send (RTS) frame type in accordance with the indication that the second wireless communication device has disabled the communication mode.

In some examples, the DSO component 830 is configurable or configured to transmit an announcement frame associated with the DSO frame exchange, where the announcement frame is an MU-request to send (RTS) frame type in accordance with the indication that the second wireless communication device has disabled the communication mode.

In some examples, the DSO component 830 is configurable or configured to transmit the data frame via a secondary subchannel, where the subchannel includes the secondary subchannel. In some examples, the DSO component 830 is configurable or configured to transmit a request for feedback associated with the data frame via a primary subchannel after a threshold time period after the data frame.

In some examples, the feedback component 840 is configurable or configured to receive, in association with transmitting the request, an acknowledgement frame or a block acknowledgement (BA) frame including the feedback associated with the data frame via the primary subchannel.

In some examples, the request for the feedback associate with the data frame is transmitted via the primary subchannel in accordance with the indication that the second wireless communication device has disabled the communication mode.

In some examples, the indication that the second wireless communication device have disabled the communication mode associated with the uplink MU communication is associated with a disabled uplink MU operation or a disabled uplink MU data operation, or both.

Figure 9:
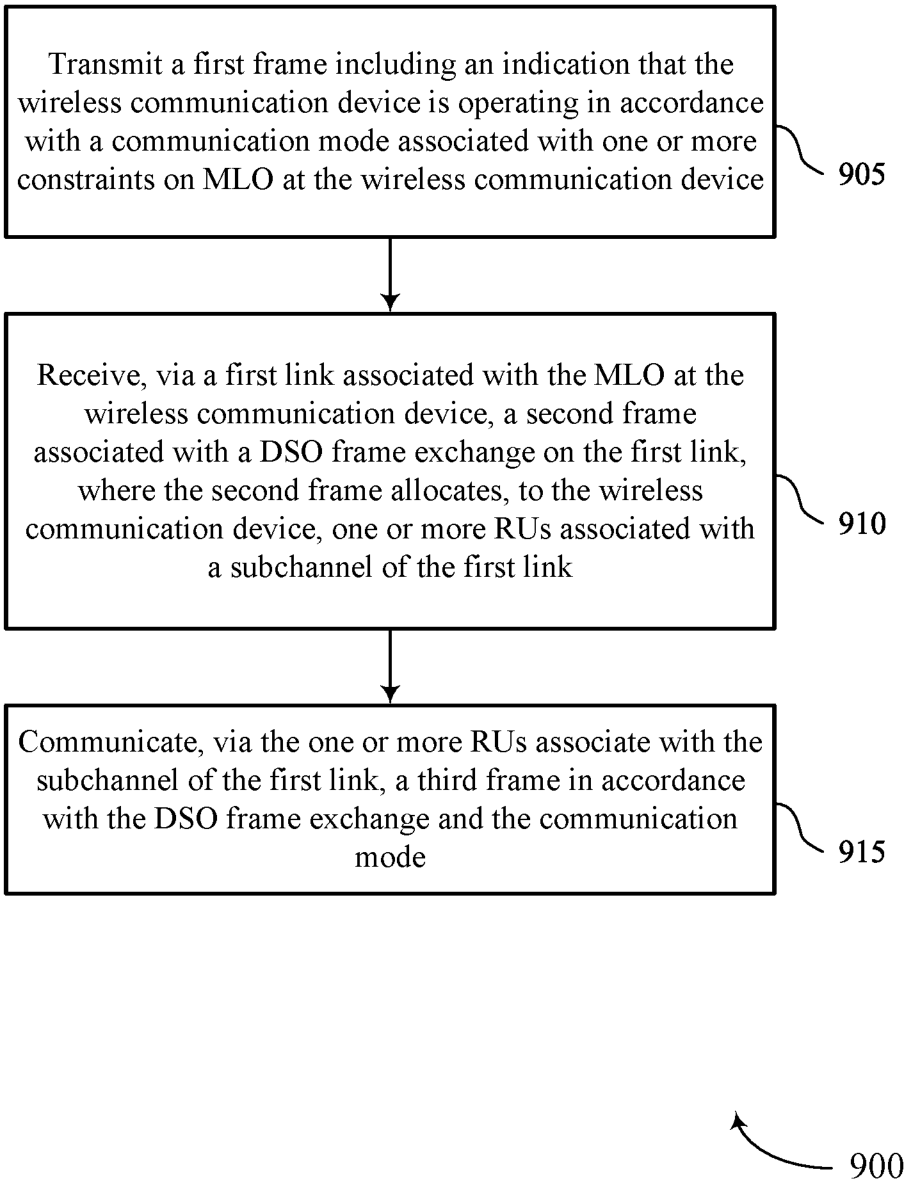
FIGS. 9-12 show flowcharts illustrating example processes performable by or at a wireless communication device that supports addressing client constraints in DSO.

FIG. 9 shows a flowchart illustrating an example process 900 performable by or at a wireless communication device that supports addressing client constraints in dynamic subchannel operation. The operations of the process 900 may be implemented by a wireless communication device or its components as described herein. For example, the process 900 may be performed by a wireless communication device, such as the wireless communication device 700 described with reference to FIG. 7, operating as or within a wireless STA. In some examples, the process 900 may be performed by a wireless STA, such as one of the STAs 104 described with reference to FIG. 1.

In some examples, in block 905, the wireless communication device may transmit a first frame including an indication that the wireless communication device is operating in accordance with a communication mode associated with one or more constraints on MLO at the wireless communication device. The operations of block 905 may be performed in accordance with examples as disclosed herein. In some implementations, aspects of the operations of block 905 may be performed by an MLO component 725 as described with reference to FIG. 7.

In some examples, in block 910, the wireless communication device may receive, via a first link associated with the MLO at the wireless communication device, a second frame associated with a DSO frame exchange on the first link, where the second frame allocates, to the wireless communication device, one or more RUs associated with a subchannel of the first link. The operations of block 910 may be performed in accordance with examples as disclosed herein. In some implementations, aspects of the operations of block 910 may be performed by a DSO component 730 as described with reference to FIG. 7.

In some examples, in block 915, the wireless communication device may communicate, via the one or more RUs associate with the subchannel of the first link, a third frame in accordance with the DSO frame exchange and the communication mode. The operations of block 915 may be performed in accordance with examples as disclosed herein. In some implementations, aspects of the operations of block 915 may be performed by a DSO component 730 as described with reference to FIG. 7.

Figure 10:
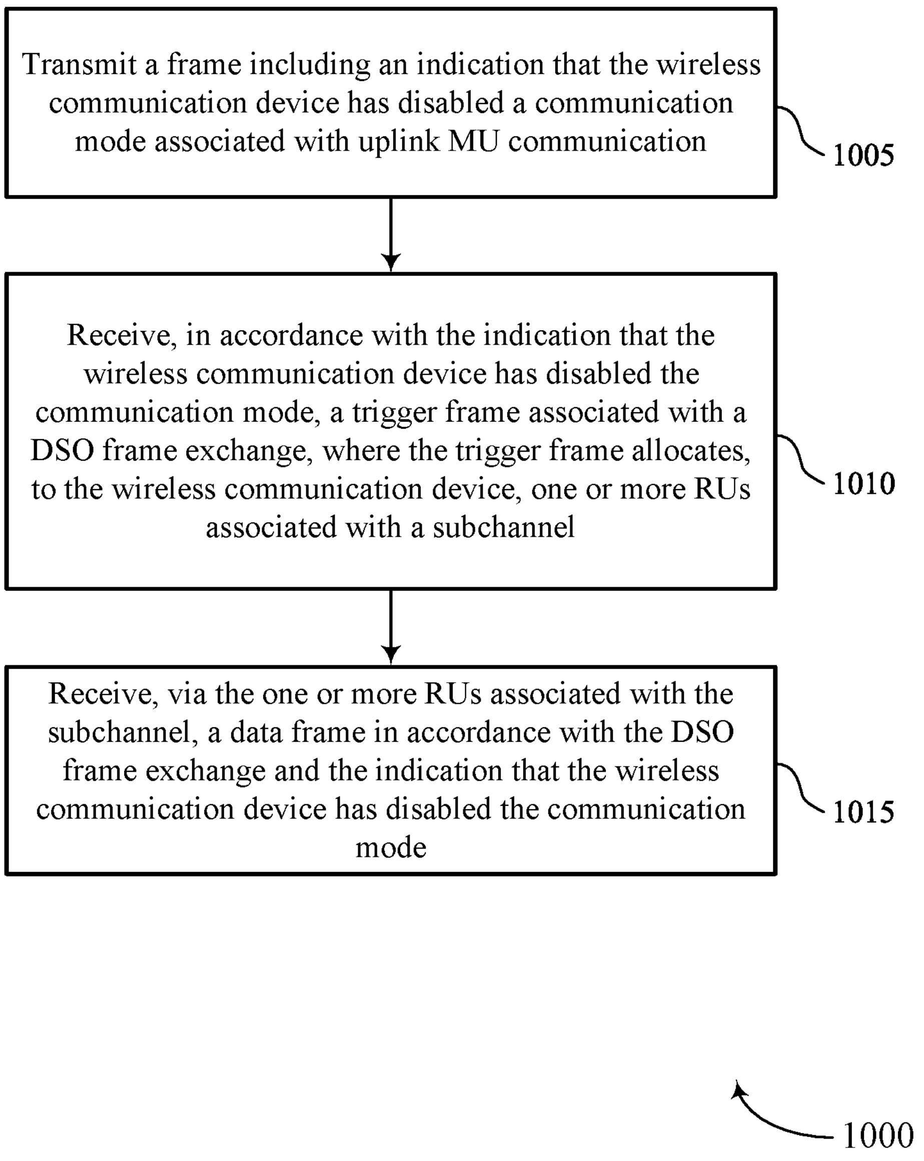

FIG. 10 shows a flowchart illustrating an example process 1000 performable by or at a wireless communication device that supports addressing client constraints in dynamic subchannel operation. The operations of the process 1000 may be implemented by a wireless communication device or its components as described herein. For example, the process 1000 may be performed by a wireless communication device, such as the wireless communication device 700 described with reference to FIG. 7, operating as or within a wireless STA. In some examples, the process 1000 may be performed by a wireless STA, such as one of the STAs 104 described with reference to FIG. 1.

In some examples, in block 1005, the wireless communication device may transmit a frame including an indication that the wireless communication device has disabled a communication mode associated with uplink MU communication. The operations of block 1005 may be performed in accordance with examples as disclosed herein. In some implementations, aspects of the operations of block 1005 may be performed by a MU communication component 735 as described with reference to FIG. 7.

In some examples, in block 1010, the wireless communication device may receive, in accordance with the indication that the wireless communication device has disabled the communication mode, a trigger frame associated with a DSO frame exchange, where the trigger frame allocates, to the wireless communication device, one or more RUs associated with a subchannel. The operations of block 1010 may be performed in accordance with examples as disclosed herein. In some implementations, aspects of the operations of block 1010 may be performed by a DSO component 730 as described with reference to FIG. 7.

In some examples, in block 1015, the wireless communication device may receive, via the one or more RUs associated with the subchannel, a data frame in accordance with the DSO frame exchange and the indication that the wireless communication device has disabled the communication mode. The operations of block 1015 may be performed in accordance with examples as disclosed herein. In some implementations, aspects of the operations of block 1015 may be performed by a DSO component 730 as described with reference to FIG. 7.

Figure 11:
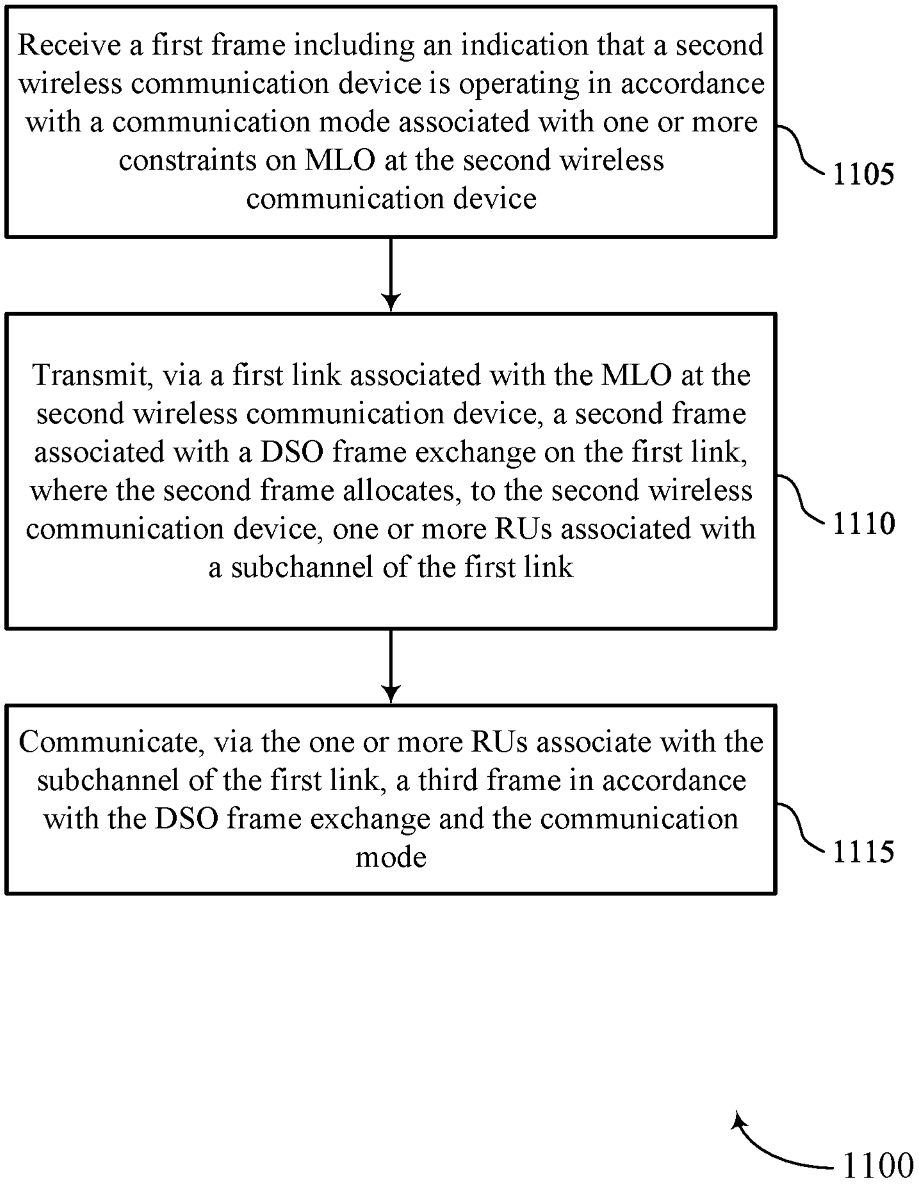

FIG. 11 shows a flowchart illustrating an example process 1100 performable by or at a first wireless communication device that supports addressing client constraints in dynamic subchannel operation. The operations of the process 1100 may be implemented by a first wireless communication device or its components as described herein. For example, the process 1100 may be performed by a wireless communication device, such as the wireless communication device 800 described with reference to FIG. 8, operating as or within a wireless AP. In some examples, the process 1100 may be performed by a wireless AP, such as one of the APs 102 described with reference to FIG. 1.

In some examples, in block 1105, the first wireless communication device may receive a first frame including an indication that a second wireless communication device is operating in accordance with a communication mode associated with one or more constraints on MLO at the second wireless communication device. The operations of block 1105 may be performed in accordance with examples as disclosed herein. In some implementations, aspects of the operations of block 1105 may be performed by an MLO component 825 as described with reference to FIG. 8.

In some examples, in block 1110, the first wireless communication device may transmit, via a first link associated with the MLO at the second wireless communication device, a second frame associated with a DSO frame exchange on the first link, where the second frame allocates, to the second wireless communication device, one or more RUs associated with a subchannel of the first link. The operations of block 1110 may be performed in accordance with examples as disclosed herein. In some implementations, aspects of the operations of block 1110 may be performed by a DSO component 830 as described with reference to FIG. 8.

In some examples, in block 1115, the first wireless communication device may communicate, via the one or more RUs associate with the subchannel of the first link, a third frame in accordance with the DSO frame exchange and the communication mode. The operations of block 1115 may be performed in accordance with examples as disclosed herein. In some implementations, aspects of the operations of block 1115 may be performed by a DSO component 830 as described with reference to FIG. 8.

Figure 12:
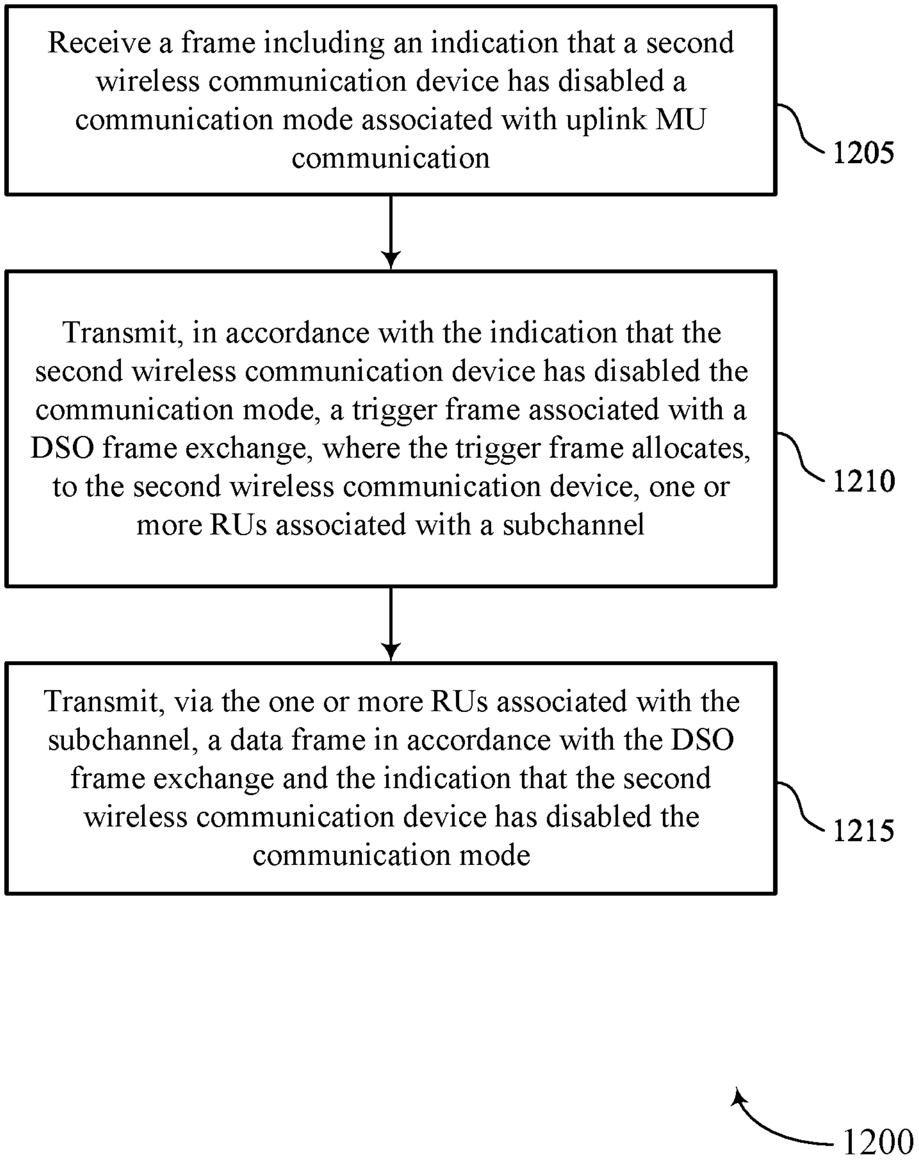

FIG. 12 shows a flowchart illustrating an example process 1200 performable by or at a first wireless communication device that supports addressing client constraints in dynamic subchannel operation. The operations of the process 1200 may be implemented by a first wireless communication device or its components as described herein. For example, the process 1200 may be performed by a wireless communication device, such as the wireless communication device 800 described with reference to FIG. 8, operating as or within a wireless AP. In some examples, the process 1200 may be performed by a wireless AP, such as one of the APs 102 described with reference to FIG. 1.

In some examples, in block 1205, the first wireless communication device may receive a frame including an indication that a second wireless communication device has disabled a communication mode associated with uplink MU communication. The operations of block 1205 may be performed in accordance with examples as disclosed herein. In some implementations, aspects of the operations of block 1205 may be performed by a MU communication component 835 as described with reference to FIG. 8.

In some examples, in block 1210, the first wireless communication device may transmit, in accordance with the indication that the second wireless communication device has disabled the communication mode, a trigger frame associated with a DSO frame exchange, where the trigger frame allocates, to the second wireless communication device, one or more RUs associated with a subchannel. The operations of block 1210 may be performed in accordance with examples as disclosed herein. In some implementations, aspects of the operations of block 1210 may be performed by a DSO component 830 as described with reference to FIG. 8.

In some examples, in block 1215, the first wireless communication device may transmit, via the one or more RUs associated with the subchannel, a data frame in accordance with the DSO frame exchange and the indication that the second wireless communication device has disabled the communication mode. The operations of block 1215 may be performed in accordance with examples as disclosed herein. In some implementations, aspects of the operations of block 1215 may be performed by a DSO component 830 as described with reference to FIG. 8.

Implementation examples are described in the following numbered clauses:

Clause 1: A wireless communication device, including: a processing system that includes processor circuitry and memory circuitry that stores code, the processing system configured to cause the wireless communication device to: transmit a first frame including an indication that the wireless communication device is operating in accordance with a communication mode associated with one or more constraints on multi-link operation (MLO) at the wireless communication device; receive, via a first link associated with the MLO at the wireless communication device, a second frame associated with a dynamic subchannel operation (DSO) frame exchange on the first link, where the second frame allocates, to the wireless communication device, one or more resource units (RUs) associated with a subchannel of the first link; and communicating, via the one or more RUs associate with the subchannel of the first link, a third frame in accordance with the DSO frame exchange and the communication mode.

Clause 2: The wireless communication device of clause 1, where, to communicate the third frame, the processing system is configured to cause the wireless communication device to: transmit the third frame as a response to the second frame, where the second frame is a trigger frame associated with the DSO frame exchange.

Clause 3: The wireless communication device of any of clauses 1-2, where the processing system is configured to cause the wireless communication device to: switch to a transmit mode on the subchannel of the first link in association with the second frame allocating the one or more RUs associated with the subchannel of the first link, where the third frame is transmitted after switching to the transmit mode on the subchannel of the first link.

Clause 4: The wireless communication device of any of clauses 1-3, where the processing system is configured to cause the wireless communication device to: interpret the second frame as an initial control frame of the communication mode, where transmitting the third frame after switching to the transmit mode on the subchannel of the first link is in association with interpreting the second frame as the initial control frame of the communication mode.

Clause 5: The wireless communication device of clause 1, where, to communicate the third frame, the processing system is configured to cause the wireless communication device to: receive the third frame via the one or more RUs associated with the subchannel of the first link, where the second frame is an announcement frame associated with the DSO frame exchange, and where the third frame is a trigger frame associated with the DSO frame exchange.

Clause 6: The wireless communication device of any of clauses 1 or 5, where the processing system is configured to cause the wireless communication device to: switch to a receive mode on the subchannel of the first link in association with the second frame allocating the one or more RUs associated with the subchannel of the first link, where the third frame is received after switching to the receive mode on the subchannel of the first link.

Clause 7: The wireless communication device of any of clauses 1 or 5-6, where the processing system is configured to cause the wireless communication device to: interpret the second frame as an initial control frame of the communication mode, where receiving the third frame after switching to the receive mode on the subchannel of the first link is in association with interpreting the second frame as the initial control frame of the communication mode.

Clause 8: The wireless communication device of any of clauses 1 or 5-7, where the processing system is configured to cause the wireless communication device to: transmit, via the one or more RUs associated with the subchannel of the first link, a fourth frame as a response to the third frame.

Clause 9: The wireless communication device of any of clauses 1 or 5-8, where the processing system is configured to cause the wireless communication device to: switch to a transmit mode on the subchannel of the first link in association with receiving the third frame, where the fourth frame is transmitted after switching to the transmit mode on the subchannel of the first link.

Clause 10: The wireless communication device of any of clauses 1-9, where the processing system is configured to cause the wireless communication device to: transmit, via a STA affiliated with the wireless communication device, an indication that the STA supports the DSO frame exchange on the first link, where the indication that the STA supports the DSO frame exchange on the first link is independent from the indication that the wireless communication device is operating in accordance with the communication mode.

Clause 11: The wireless communication device of any of clauses 1-10, where the processing system is configured to cause the wireless communication device to: transmit, via a fourth frame, information indicative of multiple sets of padding delay and transition delay in association with operating in accordance with the communication mode and supporting the DSO frame exchange on the first link, where communication via the one or more RUs associated with the subchannel of the first link is in accordance with at least one of the multiple sets of padding delay and transition delay.

Clause 12: The wireless communication device of any of clauses 1-11, where a first set including a first padding delay and a first transition delay, where the first padding delay and the first transition delay are associated with a switch to a primary subchannel of the first link, and where a padding portion of the second frame is associated with the first padding delay in accordance with the subchannel being the primary subchannel; and a second set including a second padding delay and a second transition delay, where the second padding delay and the second transition delay are associated with a switch to a secondary subchannel of the first link, and where the padding portion of the second frame is associated with the second padding delay in accordance with the subchannel being the secondary subchannel.

Clause 13: The wireless communication device of any of clauses 1-12, where the first padding delay and the first transition delay are included in a first set of one or more fields of the fourth frame; and the second padding delay and the second transition delay are included in a second set of one or more fields of the fourth frame.

Clause 14: The wireless communication device of any of clauses 1-13, where the fourth frame is an association frame, and the processing system is configured to cause the wireless communication device to: transmit, after association with an AP multi-link device (MLD), updated versions of the multiple sets of padding delay and transition delay via a fifth frame.

Clause 15: The wireless communication device of any of clauses 1-14, where the subchannel is a primary subchannel of the first link in accordance with the wireless communication device operating in accordance with the communication mode.

Clause 16: The wireless communication device of any of clauses 1-14, where the subchannel is a secondary subchannel of the first link, the secondary subchannel being outside of an operating bandwidth of the wireless communication device on the first link.

Clause 17: The wireless communication device of any of clauses 1-16, where the communication mode is an enhanced multi-link single-radio (EMLSR) mode or an enhanced multi-link multi-radio (EMLMR) mode, and the one or more constraints on the MLO at the wireless communication device include a constraint to communicate via a link on which an initial control frame is received.

Clause 18: The wireless communication device of any of clauses 1-17, where the first frame is an enhanced multi-link (EML) operating mode notification frame that enables the EMLSR mode or the EMLMR mode.

Clause 19: The wireless communication device of any of clauses 1-18, where the one or more constraints on the MLO at the wireless communication device include a constraint from communicating via the first link and a second link simultaneously.

Clause 20: The wireless communication device of any of clauses 1-19, where the first link and the second link form an enhanced multi-link single-radio (EMLSR) link set of the wireless communication device.

Clause 21: A wireless communication device, including: a processing system that includes processor circuitry and memory circuitry that stores code, the processing system configured to cause the wireless communication device to: transmit a frame including an indication that the wireless communication device has disabled a communication mode associated with uplink multi-user (MU) communication; receive, in accordance with the indication that the wireless communication device has disabled the communication mode, a trigger frame associated with a dynamic subchannel operation (DSO) frame exchange, where the trigger frame allocates, to the wireless communication device, one or more resource units (RUs) associated with a subchannel; and receive, via the one or more RUs associated with the subchannel, a data frame in accordance with the DSO frame exchange and the indication that the wireless communication device has disabled the communication mode.

Clause 22: The wireless communication device of clause 21, where the DSO frame exchange is exclusively associated with downlink communication to the wireless communication device in accordance with the indication that the wireless communication device has disabled the communication mode.

Clause 23: The wireless communication device of any of clauses 21-22, where the trigger frame is an MU-request to send (RTS) frame type in accordance with the indication that the wireless communication device has disabled the communication mode.

Clause 24: The wireless communication device of any of clauses 21-23, where the processing system is configured to cause the wireless communication device to: receive an announcement frame associated with the DSO frame exchange, where the announcement frame is an MU-request to send (RTS) frame type in accordance with the indication that the wireless communication device has disabled the communication mode.

Clause 25: The wireless communication device of any of clauses 21-24, where the processing system is configured to cause the wireless communication device to: receive the data frame via a secondary subchannel, where the subchannel includes the secondary subchannel; switch from the secondary subchannel to a primary subchannel in accordance with an absence of communication to the wireless communication device for a threshold time period after the data frame; and receive a request for feedback associated with the data frame via the primary subchannel after switching from the secondary subchannel to the primary subchannel.

Clause 26: The wireless communication device of any of clauses 21-25, where the processing system is configured to cause the wireless communication device to: transmit, in association with receiving the request, an acknowledgement frame or a block acknowledgement (BA) frame including the feedback associated with the data frame via the primary subchannel.

Clause 27: The wireless communication device of any of clauses 21-26, where the request for the feedback associated with the data frame is received via the primary subchannel in accordance with the indication that the wireless communication device has disabled the communication mode.

Clause 28: The wireless communication device of any of clauses 21-27, where the indication that the wireless communication device has disabled the communication mode associated with the uplink MU communication is associated with a disabled uplink MU operation or a disabled uplink MU data operation, or both.

Clause 29: A first wireless communication device, including: a processing system that includes processor circuitry and memory circuitry that stores code, the processing system configured to cause the first wireless communication device to: receive a first frame including an indication that a second wireless communication device is operating in accordance with a communication mode associated with one or more constraints on multi-link operation (MLO) at the second wireless communication device; transmit, via a first link associated with the MLO at the second wireless communication device, a second frame associated with a dynamic subchannel operation (DSO) frame exchange on the first link, where the second frame allocates, to the second wireless communication device, one or more resource units (RUs) associated with a subchannel of the first link; and communicating, via the one or more RUs associate with the subchannel of the first link, a third frame in accordance with the DSO frame exchange and the communication mode.

Clause 30: The first wireless communication device of clause 29, where, to communicate the third frame, the processing system is configured to cause the first wireless communication device to: receive the third frame as a response to the second frame, where the second frame is a trigger frame associated with the DSO frame exchange.

Clause 31: The first wireless communication device of any of clauses 29-30, where the second frame triggers the second wireless communication device to switch to a transmit mode on the subchannel of the first link, and the second frame is transmitted as an initial control frame of the communication mode in accordance with receiving the indication that the second wireless communication device is operating in accordance with the communication mode.

Clause 32: The first wireless communication device of clause 29, where, to communicate the third frame, the processing system is configured to cause the first wireless communication device to: transmit the third frame via the one or more RUs associated with the subchannel of the first link, where the second frame is an announcement frame associated with the DSO frame exchange, and where the third frame is a trigger frame associated with the DSO frame exchange.

Clause 33: The first wireless communication device of any of clauses 29 or 32, where the second frame triggers the second wireless communication device to switch to a receive mode on the subchannel of the first link, and the second frame is transmitted as an initial control frame of the communication mode in accordance with receiving the indication that the second wireless communication device is operating in accordance with the communication mode.

Clause 34: The first wireless communication device of any of clauses 29 or 32-33, the processing system is configured to cause the first wireless communication device to: receive, via the one or more RUs associated with the subchannel of the first link, a fourth frame as a response to the third frame.

Clause 35: The first wireless communication device of any of clauses 29 or 32-34, where the third frame triggers the second wireless communication device to switch to a transmit mode on the subchannel of the first link.

Clause 36: The first wireless communication device of any of clauses 29-35, the processing system is configured to cause the first wireless communication device to: receive, from a STA affiliated with the second wireless communication device, an indication that the STA supports the DSO frame exchange on the first link, where the indication that the STA supports the DSO frame exchange on the first link is independent from the indication that the second wireless communication device is operating in accordance with the communication mode.

Clause 37: The first wireless communication device of any of clauses 29-36, the processing system is configured to cause the first wireless communication device to: receive, via a fourth frame, information indicative of multiple sets of padding delay and transition delay in association with receiving the indication that the second wireless communication device operates in accordance with the communication mode and supports the DSO frame exchange on the first link, where communication via the one or more RUs associated with the subchannel of the first link is in accordance with at least one of the multiple sets of padding delay and transition delay.

Clause 38: The first wireless communication device of any of clauses 29-37, where a first set including a first padding delay and a first transition delay, where the first padding delay and the first transition delay are associated with a switch to a primary subchannel of the first link, and where a padding portion of the second frame is associated with the first padding delay in accordance with the subchannel being the primary subchannel; and a second set including a second padding delay and a second transition delay, where the second padding delay and the second transition delay are associated with a switch to a secondary subchannel of the first link, and where the padding portion of the second frame is associated with the second padding delay in accordance with the subchannel being the secondary subchannel.

Clause 39: The first wireless communication device of any of clauses 29-38, where the first padding delay and the first transition delay are included in a first set of one or more fields of the fourth frame; and the second padding delay and the second transition delay are included in a second set of one or more fields of the fourth frame.

Clause 40: The first wireless communication device of any of clauses 29-39, where the fourth frame is an association frame, and the processing system is configured to cause the first wireless communication device to: receive, after association with the second wireless communication device, updated versions of the multiple sets of padding delay and transition delay via a fifth frame.

Clause 41: The first wireless communication device of any of clauses 29-40, where the subchannel is a primary subchannel of the first link in accordance with the second wireless communication device operating in accordance with the communication mode.

Clause 42: The first wireless communication device of any of clauses 29-41, the processing system is configured to cause the first wireless communication device to: transmit, via a trigger frame associated with the DSO frame exchange, a padding portion associated a padding delay of the second wireless communication device to switch from a listening mode on the primary subchannel to a transmit or receive mode on the primary subchannel, where the padding portion is included in the trigger frame in accordance with the second wireless communication device being an extremely high throughput (EHT) device.

Clause 43: The first wireless communication device of any of clauses 29-40, where the subchannel is a secondary subchannel of the first link, the secondary subchannel being outside of an operating bandwidth of the second wireless communication device on the first link.

Clause 44: The first wireless communication device of any of clauses 29-43, where the communication mode is an enhanced multi-link single-radio (EMLSR) mode or an enhanced multi-link multi-radio (EMLMR) mode, and the one or more constraints on the MLO at the second wireless communication device include a constraint to communicate via a link on which an initial control frame is received.

Clause 45: The first wireless communication device of any of clauses 29-44, where the first frame is an enhanced multi-link (EML) operating mode notification frame that enables the EMLSR mode or the EMLMR mode.

Clause 46: The first wireless communication device of any of clauses 29-45, where the one or more constraints on the MLO at the wireless communication device include a constraint from communicating via the first link and a second link simultaneously.

Clause 47: The first wireless communication device of any of clauses 29-46, where the first link and the second link form an enhanced multi-link single-radio (EMLSR) link set of the second wireless communication device.

Clause 48: A first wireless communication device, including: a processing system that includes processor circuitry and memory circuitry that stores code, the processing system configured to cause the first wireless communication device to: receive a frame including an indication that a second wireless communication device has disabled a communication mode associated with uplink multi-user (MU) communication; transmit, in accordance with the indication that the second wireless communication device has disabled the communication mode, a trigger frame associated with a dynamic subchannel operation (DSO) frame exchange, where the trigger frame allocates, to the second wireless communication device, one or more resource units (RUs) associated with a subchannel; and transmit, via the one or more RUs associated with the subchannel, a data frame in accordance with the DSO frame exchange and the indication that the second wireless communication device has disabled the communication mode.

Clause 49: The first wireless communication device of clause 48, where the DSO frame exchange is exclusively associated with downlink communication to the second wireless communication device in accordance with the indication that the second wireless communication device has disabled the communication mode.

Clause 50: The first wireless communication device of any of clauses 48-49, where the trigger frame is an MU-request to send (RTS) frame type in accordance with the indication that the second wireless communication device has disabled the communication mode.

Clause 51: The first wireless communication device of any of clauses 48-50, the processing system is configured to cause the first wireless communication device to: transmit an announcement frame associated with the DSO frame exchange, where the announcement frame is an MU-request to send (RTS) frame type in accordance with the indication that the second wireless communication device has disabled the communication mode.

Clause 52: The first wireless communication device of any of clauses 48-51, the processing system is configured to cause the first wireless communication device to: transmit the data frame via a secondary subchannel, where the subchannel includes the secondary subchannel; and transmit a request for feedback associated with the data frame via a primary subchannel after a threshold time period after the data frame.

Clause 53: The first wireless communication device of any of clauses 48-52, the processing system is configured to cause the first wireless communication device to: receive, in association with transmitting the request, an acknowledgement frame or a block acknowledgement (BA) frame including the feedback associated with the data frame via the primary subchannel.

Clause 54: The first wireless communication device of any of clauses 48-53, where the request for the feedback associated with the data frame is transmitted via the primary subchannel in accordance with the indication that the second wireless communication device has disabled the communication mode.

Clause 55: The first wireless communication device of any of clauses 48-54, where the indication that the second wireless communication device has disabled the communication mode associated with the uplink MU communication is associated with a disabled uplink MU operation or a disabled uplink MU data operation, or both.

Clause 56: A method for wireless communication by a wireless communication device, including: transmitting a first frame including an indication that the wireless communication device is operating in accordance with a communication mode associated with one or more constraints on multi-link operation (MLO) at the wireless communication device; receiving, via a first link associated with the MLO at the wireless communication device, a second frame associated with a dynamic subchannel operation (DSO) frame exchange on the first link, where the second frame allocates, to the wireless communication device, one or more resource units (RUs) associated with a subchannel of the first link; and communicating, via the one or more RUs associated with the subchannel of the first link, a third frame in accordance with the DSO frame exchange and the communication mode.

Clause 57: The method of clause 56, where communicating the third frame includes: transmitting the third frame as a response to the second frame, where the second frame is a trigger frame associated with the DSO frame exchange.

Clause 58: The method of any of clauses 56-57, further including: switching to a transmit mode on the subchannel of the first link in association with the second frame allocating the one or more RUs associated with the subchannel of the first link, where the third frame is transmitted after switching to the transmit mode on the subchannel of the first link.

Clause 59: The method of any of clauses 56-58, further including: interpreting the second frame as an initial control frame of the communication mode, where transmitting the third frame after switching to the transmit mode on the subchannel of the first link is in association with interpreting the second frame as the initial control frame of the communication mode.

Clause 60: The method of clause 56, where communicating the third frame includes: receiving the third frame via the one or more RUs associated with the subchannel of the first link, where the second frame is an announcement frame associated with the DSO frame exchange, and where the third frame is a trigger frame associated with the DSO frame exchange.

Clause 61: The method of any of clauses 56 or 60, further including: switching to a receive mode on the subchannel of the first link in association with the second frame allocating the one or more RUs associated with the subchannel of the first link, where the third frame is received after switching to the receive mode on the subchannel of the first link.

Clause 62: The method of any of clauses 56 or 60-61, further including: interpreting the second frame as an initial control frame of the communication mode, where receiving the third frame after switching to the receive mode on the subchannel of the first link is in association with interpreting the second frame as the initial control frame of the communication mode.

Clause 63: The method of any of clauses 56 or 60-62, further including: transmitting, via the one or more RUs associated with the subchannel of the first link, a fourth frame as a response to the third frame.

Clause 64: The method of any of clauses 56 or 60-63, further including: switching to a transmit mode on the subchannel of the first link in association with receiving the third frame, where the fourth frame is transmitted after switching to the transmit mode on the subchannel of the first link.

Clause 65: The method of any of clauses 56-64, further including: transmitting, via a STA affiliated with the wireless communication device, an indication that the STA supports the DSO frame exchange on the first link, where the indication that the STA supports the DSO frame exchange on the first link is independent from the indication that the wireless communication device is operating in accordance with the communication mode.

Clause 66: The method of any of clauses 56-65, further including: transmitting, via a fourth frame, information indicative of multiple sets of padding delay and transition delay in association with operating in accordance with the communication mode and supporting the DSO frame exchange on the first link, where communication via the one or more RUs associated with the subchannel of the first link is in accordance with at least one of the multiple sets of padding delay and transition delay.

Clause 67: The method of any of clauses 56-66, where the multiple sets of padding delay and transition delay include a first set including a first padding delay and a first transition delay, where the first padding delay and the first transition delay are associated with a switch to a primary subchannel of the first link, and where a padding portion of the second frame is associated with the first padding delay in accordance with the subchannel being the primary subchannel; and a second set including a second padding delay and a second transition delay, where the second padding delay and the second transition delay are associated with a switch to a secondary subchannel of the first link, and where the padding portion of the second frame is associated with the second padding delay in accordance with the subchannel being the secondary subchannel.

Clause 68: The method of any of clauses 56-67, where the first padding delay and the first transition delay are included in a first set of one or more fields of the fourth frame; and the second padding delay and the second transition delay are included in a second set of one or more fields of the fourth frame.

Clause 69: The method of any of clauses 56-68, where the fourth frame is an association frame, the method further including: transmitting, after association with an AP multi-link device (MLD), updated versions of the multiple sets of padding delay and transition delay via a fifth frame.

Clause 70: The method of any of clauses 56-69, where the subchannel is a primary subchannel of the first link in accordance with the wireless communication device operating in accordance with the communication mode.

Clause 71: The method of any of clauses 56-69, where the subchannel is a secondary subchannel of the first link, the secondary subchannel being outside of an operating bandwidth of the wireless communication device on the first link.

Clause 72: The method of any of clauses 56-71, where the communication mode is an enhanced multi-link single-radio (EMLSR) mode or an enhanced multi-link multi-radio (EMLMR) mode, and the one or more constraints on the MLO at the wireless communication device include a constraint to communicate via a link on which an initial control frame is received.

Clause 73: The method of any of clauses 56-72, where the first frame is an enhanced multi-link (EML) operating mode notification frame that enables the EMLSR mode or the EMLMR mode.

Clause 74: The method of any of clauses 56-73, where the one or more constraints on the MLO at the wireless communication device include a constraint from communicating via the first link and a second link simultaneously.

Clause 75: The method of any of clauses 56-74, where the first link and the second link form an enhanced multi-link single-radio (EMLSR) link set of the wireless communication device.

Clause 76: A method for wireless communication by a wireless communication device, including: transmitting a frame including an indication that the wireless communication device has disabled a communication mode associated with uplink multi-user (MU) communication; receiving, in accordance with the indication that the wireless communication device has disabled the communication mode, a trigger frame associated with a dynamic subchannel operation (DSO) frame exchange, where the trigger frame allocates, to the wireless communication device, one or more resource units (RUs) associated with a subchannel; and receiving, via the one or more RUs associated with the subchannel, a data frame in accordance with the DSO frame exchange and the indication that the wireless communication device has disabled the communication mode.

Clause 77: The method of clause 76, where the DSO frame exchange is exclusively associated with downlink communication to the wireless communication device in accordance with the indication that the wireless communication device has disabled the communication mode.

Clause 78: The method of any of clauses 76-77, where the trigger frame is an MU-request to send (RTS) frame type in accordance with the indication that the wireless communication device has disabled the communication mode.

Clause 79: The method of any of clauses 76-78, further including: receiving an announcement frame associated with the DSO frame exchange, where the announcement frame is an MU-request to send (RTS) frame type in accordance with the indication that the wireless communication device has disabled the communication mode.

Clause 80: The method of any of clauses 76-79, further including: receiving the data frame via a secondary subchannel, where the subchannel includes the secondary subchannel; switching from the secondary subchannel to a primary subchannel in accordance with an absence of communication to the wireless communication device for a threshold time period after the data frame; and receiving a request for feedback associated with the data frame via the primary subchannel after switching from the secondary subchannel to the primary subchannel.

Clause 81: The method of any of clauses 76-80, further including: transmitting, in association with receiving the request, an acknowledgement frame or a block acknowledgement (BA) frame including the feedback associated with the data frame via the primary subchannel.

Clause 82: The method of any of clauses 76-81, where the request for the feedback associated with the data frame is received via the primary subchannel in accordance with the indication that the wireless communication device has disabled the communication mode.

Clause 83: The method of any of clauses 76-82, where the indication that the wireless communication device has disabled the communication mode associated with the uplink MU communication is associated with a disabled uplink MU operation or a disabled uplink MU data operation, or both.

Clause 84: A method for wireless communication by a first wireless communication device, including: receiving a first frame including an indication that a second wireless communication device is operating in accordance with a communication mode associated with one or more constraints on multi-link operation (MLO) at the second wireless communication device; transmitting, via a first link associated with the MLO at the second wireless communication device, a second frame associated with a dynamic subchannel operation (DSO) frame exchange on the first link, where the second frame allocates, to the second wireless communication device, one or more resource units (RUs) associated with a subchannel of the first link; and communicating, via the one or more RUs associated with the subchannel of the first link, a third frame in accordance with the DSO frame exchange and the communication mode.

Clause 85: The method of clause 84, where communicating the third frame includes: receiving the third frame as a response to the second frame, where the second frame is a trigger frame associated with the DSO frame exchange.

Clause 86: The method of any of clauses 84-85, where the second frame triggers the second wireless communication device to switch to a transmit mode on the subchannel of the first link, and the second frame is transmitted as an initial control frame of the communication mode in accordance with receiving the indication that the second wireless communication device is operating in accordance with the communication mode.

Clause 87: The method of clause 84, where communicating the third frame includes: transmitting the third frame via the one or more RUs associated with the subchannel of the first link, where the second frame is an announcement frame associated with the DSO frame exchange, and where the third frame is a trigger frame associated with the DSO frame exchange.

Clause 88: The method of any of clauses 84 or 87, where the second frame triggers the second wireless communication device to switch to a receive mode on the subchannel of the first link, and the second frame is transmitted as an initial control frame of the communication mode in accordance with receiving the indication that the second wireless communication device is operating in accordance with the communication mode.

Clause 89: The method of any of clauses 84 or 87-88, further including: receiving, via the one or more RUs associated with the subchannel of the first link, a fourth frame as a response to the third frame.

Clause 90: The method of any of clauses 84 or 87-89, where the third frame triggers the second wireless communication device to switch to a transmit mode on the subchannel of the first link.

Clause 91: The method of any of clauses 84-90, further including: receiving, from a STA affiliated with the second wireless communication device, an indication that the STA supports the DSO frame exchange on the first link, where the indication that the STA supports the DSO frame exchange on the first link is independent from the indication that the second wireless communication device is operating in accordance with the communication mode.

Clause 92: The method of any of clauses 84-91, further including: receiving, via a fourth frame, information indicative of multiple sets of padding delay and transition delay in association with receiving the indication that the second wireless communication device operates in accordance with the communication mode and supports the DSO frame exchange on the first link, where communication via the one or more RUs associated with the subchannel of the first link is in accordance with at least one of the multiple sets of padding delay and transition delay.

Clause 93: The method of any of clauses 84-92, where the multiple sets of padding delay and transition delay include a first set including a first padding delay and a first transition delay, where the first padding delay and the first transition delay are associated with a switch to a primary subchannel of the first link, and where a padding portion of the second frame is associated with the first padding delay in accordance with the subchannel being the primary subchannel; and a second set including a second padding delay and a second transition delay, where the second padding delay and the second transition delay are associated with a switch to a secondary subchannel of the first link, and where the padding portion of the second frame is associated with the second padding delay in accordance with the subchannel being the secondary subchannel.

Clause 94: The method of any of clauses 84-93, where the first padding delay and the first transition delay are included in a first set of one or more fields of the fourth frame; and the second padding delay and the second transition delay are included in a second set of one or more fields of the fourth frame.

Clause 95: The method of any of clauses 84-94, where the fourth frame is an association frame, the method further including: receiving, after association with the second wireless communication device, updated versions of the multiple sets of padding delay and transition delay via a fifth frame.

Clause 96: The method of any of clauses 84-95, where the subchannel is a primary subchannel of the first link in accordance with the second wireless communication device operating in accordance with the communication mode.

Clause 97: The method of any of clauses 84-96, further including: transmitting, via a trigger frame associated with the DSO frame exchange, a padding portion associated a padding delay of the second wireless communication device to switch from a listening mode on the primary subchannel to a transmit or receive mode on the primary subchannel, where the padding portion is included in the trigger frame in accordance with the second wireless communication device being an extremely high throughput (EHT) device.

Clause 98: The method of any of clauses 84-95, where the subchannel is a secondary subchannel of the first link, the secondary subchannel being outside of an operating bandwidth of the second wireless communication device on the first link.

Clause 99: The method of any of clauses 84-98, where the communication mode is an enhanced multi-link single-radio (EMLSR) mode or an enhanced multi-link multi-radio (EMLMR) mode, and the one or more constraints on the MLO at the second wireless communication device include a constraint to communicate via a link on which an initial control frame is received.

Clause 100: The method of any of clauses 84-99, where the first frame is an enhanced multi-link (EML) operating mode notification frame that enables the EMLSR mode or the EMLMR mode.

Clause 101: The method of any of clauses 84-100, where the one or more constraints on the MLO at the wireless communication device include a constraint from communicating via the first link and a second link simultaneously.

Clause 102: The method of any of clauses 84-101, where the first link and the second link form an enhanced multi-link single-radio (EMLSR) link set of the second wireless communication device.

Clause 103: A method for wireless communication by a first wireless communication device, including: receiving a frame including an indication that a second wireless communication device has disabled a communication mode associated with uplink multi-user (MU) communication; transmitting, in accordance with the indication that the second wireless communication device has disabled the communication mode, a trigger frame associated with a dynamic subchannel operation (DSO) frame exchange, where the trigger frame allocates, to the second wireless communication device, one or more resource units (RUs) associated with a subchannel; and transmitting, via the one or more RUs associated with the subchannel, a data frame in accordance with the DSO frame exchange and the indication that the second wireless communication device has disabled the communication mode.

Clause 104: The method of clause 103, where the DSO frame exchange is exclusively associated with downlink communication to the second wireless communication device in accordance with the indication that the second wireless communication device has disabled the communication mode.

Clause 105: The method of any of clauses 103-104, where the trigger frame is an MU-request to send (RTS) frame type in accordance with the indication that the second wireless communication device has disabled the communication mode.

Clause 106: The method of any of clauses 103-105, further including: transmitting an announcement frame associated with the DSO frame exchange, where the announcement frame is an MU-request to send (RTS) frame type in accordance with the indication that the second wireless communication device has disabled the communication mode.

Clause 107: The method of any of clauses 103-106, further including: transmitting the data frame via a secondary subchannel, where the subchannel includes the secondary subchannel; and transmitting a request for feedback associated with the data frame via a primary subchannel after a threshold time period after the data frame.

Clause 108: The method of any of clauses 103-107, further including: receiving, in association with transmitting the request, an acknowledgement frame or a block acknowledgement (BA) frame including the feedback associated with the data frame via the primary subchannel.

Clause 109: The method of any of clauses 103-108, where the request for the feedback associated with the data frame is transmitted via the primary subchannel in accordance with the indication that the second wireless communication device has disabled the communication mode.

Clause 110: The method of any of clauses 103-109, where the indication that the second wireless communication device has disabled the communication mode associated with the uplink MU communication is associated with a disabled uplink MU operation or a disabled uplink MU data operation, or both.

Aspect 111: A wireless communication device for wireless communication, including at least one means for performing a method of any of aspects 56-75.

Aspect 112: A non-transitory computer-readable medium storing code for wireless communication, the code including instructions executable by one or more processors to perform a method of any of aspects 56-75.

Aspect 113: A wireless communication device for wireless communication, including at least one means for performing a method of any of aspects 76-83.

Aspect 114: A non-transitory computer-readable medium storing code for wireless communication, the code including instructions executable by one or more processors to perform a method of any of aspects 76-83.

Aspect 115: A first wireless communication device for wireless communication, including at least one means for performing a method of any of aspects 84-102.

Aspect 116: A non-transitory computer-readable medium storing code for wireless communication, the code including instructions executable by one or more processors to perform a method of any of aspects 84-102.

Aspect 117: A first wireless communication device for wireless communication, including at least one means for performing a method of any of aspects 103-110.

Aspect 118: A non-transitory computer-readable medium storing code for wireless communication, the code including instructions executable by one or more processors to perform a method of any of aspects 103-110.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:

a processing system that includes processor circuitry and memory circuitry that stores code, the processing system configured to cause the wireless communication device to:

transmit a first frame including an indication that the wireless communication device is operating in accordance with a communication mode associated with one or more constraints on multi-link operation (MLO) at the wireless communication device;

receive, via a first link associated with the MLO at the wireless communication device, a second frame associated with a dynamic subchannel operation (DSO) frame exchange on the first link, wherein the second frame allocates, to the wireless communication device, one or more resource units (RUs) associated with a subchannel of the first link;

communicate, via the one or more RUs associated with the subchannel of the first link, a third frame in accordance with the DSO frame exchange and the communication mode; and transmit information indicative of multiple sets of padding delay and transition delay in association with transmitting the indication that the wireless communication device operates in accordance with the communication mode and supports the DSO frame exchange on the first link, wherein communicating via the one or more RUs associated with the subchannel of the first link is in accordance with at least one of the multiple sets of padding delay and transition delay.

2. The wireless communication device of claim 1, wherein, to communicate the third frame, the processing system is configured to cause the wireless communication device to:

transmit the third frame as a response to the second frame, wherein the second frame is a trigger frame associated with the DSO frame exchange.

3. The wireless communication device of claim 2, wherein the processing system is further configured to cause the wireless communication device to:

switch to a transmit mode on the subchannel of the first link in association with the second frame allocating the one or more RUs associated with the subchannel of the first link, wherein the third frame is transmitted after switching to the transmit mode on the subchannel of the first link.

4. The wireless communication device of claim 3, wherein the processing system is further configured to cause the wireless communication device to:

interpret the second frame as an initial control frame of the communication mode, wherein transmitting the third frame after switching to the transmit mode on the subchannel of the first link is in association with interpreting the second frame as the initial control frame of the communication mode.

5. The wireless communication device of claim 1, wherein, to communicate the third frame, the processing system is configured to cause the wireless communication device to:

receive the third frame via the one or more RUs associated with the subchannel of the first link, wherein the second frame is an announcement frame associated with the DSO frame exchange, and wherein the third frame is a trigger frame associated with the DSO frame exchange.

6. The wireless communication device of claim 5, wherein the processing system is further configured to cause the wireless communication device to:

switch to a receive mode on the subchannel of the first link in association with the second frame allocating the one or more RUs associated with the subchannel of the first link, wherein the third frame is received after switching to the receive mode on the subchannel of the first link.

7. The wireless communication device of claim 6, wherein the processing system is further configured to cause the wireless communication device to:

interpret the second frame as an initial control frame of the communication mode, wherein receiving the third frame after switching to the receive mode on the subchannel of the first link is in association with interpreting the second frame as the initial control frame of the communication mode.

8. The wireless communication device of claim 5, wherein the processing system is further configured to cause the wireless communication device to:

transmit, via the one or more RUs associated with the subchannel of the first link, a fourth frame as a response to the third frame.

9. The wireless communication device of claim 8, wherein the processing system is further configured to cause the wireless communication device to:

switch to a transmit mode on the subchannel of the first link in association with receiving the third frame, wherein the fourth frame is transmitted after switching to the transmit mode on the subchannel of the first link.

10. The wireless communication device of claim 1, wherein the processing system is further configured to cause the wireless communication device to:

transmit, via a station (STA) affiliated with the wireless communication device, an indication that the STA supports the DSO frame exchange on the first link, wherein the indication that the STA supports the DSO frame exchange on the first link is independent from the indication that the wireless communication device is operating in accordance with the communication mode.

11. The wireless communication device of claim 1, wherein the communication mode is an enhanced multi-link single-radio (EMLSR) mode or an enhanced multi-link multi-radio (EMLMR) mode, and wherein the one or more constraints on the MLO at the wireless communication device include a constraint to communicate via a link on which an initial control frame is received.

12. The wireless communication device of claim 11, wherein the first frame is an enhanced multi-link (EML) operating mode notification frame that enables the EMLSR mode or the EMLMR mode.

13. The wireless communication device of claim 1, wherein the one or more constraints on the MLO at the wireless communication device include a constraint from communicating via the first link and a second link simultaneously.

14. The wireless communication device of claim 13, wherein the first link and the second link form an enhanced multi-link single-radio (EMLSR) link set of the wireless communication device.

15. A wireless communication device, comprising:

a processing system that includes processor circuitry and memory circuitry that stores code, the processing system configured to cause the wireless communication device to:

transmit a frame including an indication that the wireless communication device has disabled a communication mode associated with uplink multi-user (MU) communication, wherein the communication mode associated with the MU communication comprises an uplink MU or uplink MU data mode;

receive, in accordance with the indication that the wireless communication device has disabled the communication mode, a trigger frame associated with a dynamic subchannel operation (DSO) frame exchange, wherein the trigger frame allocates, to the wireless communication device, one or more resource units (RUs) associated with a subchannel; and receive, via the one or more RUs associated with the subchannel, a data frame in accordance with the DSO frame exchange and the indication that the wireless communication device has disabled the communication mode.

16. The wireless communication device of claim 15, wherein the DSO frame exchange is exclusively associated with downlink communication to the wireless communication device in accordance with the indication that the wireless communication device has disabled the communication mode.

17. The wireless communication device of claim 15, wherein the trigger frame is an MU-request to send (RTS) frame type in accordance with the indication that the wireless communication device has disabled the communication mode.

18. The wireless communication device of claim 15, wherein the processing system is further configured to cause the wireless communication device to:

receive an announcement frame associated with the DSO frame exchange, wherein the announcement frame is an MU-request to send (RTS) frame type in accordance with the indication that the wireless communication device has disabled the communication mode.

19. The wireless communication device of claim 15, wherein the processing system is further configured to cause the wireless communication device to:

receive the data frame via a secondary subchannel, wherein the subchannel comprises the secondary subchannel;

switch from the secondary subchannel to a primary subchannel in accordance with an absence of communication to the wireless communication device for a threshold time period after the data frame; and receive a request for feedback associated with the data frame via the primary subchannel after switching from the secondary subchannel to the primary subchannel.

20. The wireless communication device of claim 19, wherein the processing system is further configured to cause the wireless communication device to:

transmit, in association with receiving the request, an acknowledgement frame or a block acknowledgement (BA) frame including the feedback associated with the data frame via the primary subchannel.

21. A first wireless communication device, comprising:

a processing system that includes processor circuitry and memory circuitry that stores code, the processing system configured to cause the first wireless communication device to:

receive a first frame including an indication that a second wireless communication device is operating in accordance with a communication mode associated with one or more constraints on multi-link operation (MLO) at the second wireless communication device;

transmit, via a first link associated with the MLO at the second wireless communication device, a second frame associated with a dynamic subchannel operation (DSO) frame exchange on the first link, wherein the second frame allocates, to the second wireless communication device, one or more resource units (RUs) associated with a subchannel of the first link;

communicate, via the one or more RUs associated with the subchannel of the first link, a third frame in accordance with the DSO frame exchange and the communication mode; and receive information indicative of multiple sets of padding delay and transition delay in association with receiving the indication that the second wireless communication device operates in accordance with the communication mode and supports the DSO frame exchange on the first link, wherein communication via the one or more RUs associated with the subchannel of the first link is in accordance with at least one of the multiple sets of padding delay and transition delay.

22. The first wireless communication device of claim 21, wherein the processing system is further configured to cause the first wireless communication device to:

receive, from a station (STA) affiliated with the second wireless communication device, an indication that the STA supports the DSO frame exchange on the first link, wherein the indication that the STA supports the DSO frame exchange on the first link is independent from the indication that the second wireless communication device is operating in accordance with the communication mode.

23. The first wireless communication device of claim 21, wherein the multiple sets of padding delay and transition delay include:

a first set comprising a first padding delay and a first transition delay, wherein the first padding delay and the first transition delay are associated with a switch to a primary subchannel of the first link at the second wireless communication device, and wherein a padding portion of the second frame is associated with the first padding delay in accordance with the subchannel being the primary subchannel; and a second set comprising a second padding delay and a second transition delay, wherein the second padding delay and the second transition delay are associated with a switch to a secondary subchannel of the first link at the second wireless communication device, and wherein the padding portion of the second frame is associated with the second padding delay in accordance with the subchannel being the secondary subchannel.

24. The first wireless communication device of claim 23, wherein:

the first padding delay and the first transition delay are included in a first set of one or more fields; and the second padding delay and the second transition delay are included in a second set of one or more fields.

25. The first wireless communication device of claim 21, wherein the multiple sets of padding delay and transition delay are received via an association frame, and the processing system is further configured to cause the first wireless communication device to:

receive, after association with the second wireless communication device, updated versions of the multiple sets of padding delay and transition delay.

26. A first wireless communication device, comprising:

a processing system that includes processor circuitry and memory circuitry that stores code, the processing system configured to cause the first wireless communication device to:

receive a frame including an indication that a second wireless communication device has disabled a communication mode associated with uplink multi-user (MU) communication, wherein the communication mode associated with the MU communication comprises an uplink MU or uplink MU data mode;

transmit, in accordance with the indication that the second wireless communication device has disabled the communication mode, a trigger frame associated with a dynamic subchannel operation (DSO) frame exchange, wherein the trigger frame allocates, to the second wireless communication device, one or more resource units (RUs) associated with a subchannel; and transmit, via the one or more RUs associated with the subchannel, a data frame in accordance with the DSO frame exchange and the indication that the second wireless communication device has disabled the communication mode.

27. The first wireless communication device of claim 26, wherein the DSO frame exchange is exclusively associated with downlink communication to the second wireless communication device in accordance with the indication that the second wireless communication device has disabled the communication mode.

28. The first wireless communication device of claim 26, wherein the trigger frame is an MU-request to send (RTS) frame type in accordance with the indication that the second wireless communication device has disabled the communication mode.

29. The first wireless communication device of claim 26, wherein the processing system is further configured to cause the first wireless communication device to:

transmit an announcement frame associated with the DSO frame exchange, wherein the announcement frame is an MU-request to send (RTS) frame type in accordance with the indication that the second wireless communication device has disabled the communication mode.

* * * * *